US012604338B2

(12) United States Patent
Kittichokechai et al.

(10) Patent No.: US 12,604,338 B2
(45) Date of Patent: Apr. 14, 2026

(54) HANDLING DOWNLINK AND UPLINK COLLISIONS IN HALF DUPLEX FREQUENCY DIVISION DUPLEX USER EQUIPMENT

(71) Applicant: Telefonaktiebolaget LM Ericsson (publ), Stockholm (SE)

(72) Inventors: Kittipong Kittichokechai, Järfälla (SE); Yi-Pin Eric Wang, Fremont, CA (US); Johan Bergman, Stockholm (SE); Mohammad Mozaffari, Fremont (CA); Anders Wallén, Ystad (SE); Saeedeh Moloudi, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 256 days.

(21) Appl. No.: 18/272,491

(22) PCT Filed: Jan. 17, 2022

(86) PCT No.: PCT/EP2022/050926
§ 371 (c)(1),
(2) Date: Jul. 14, 2023

(87) PCT Pub. No.: WO2022/152922
PCT Pub. Date: Jul. 21, 2022

(65) Prior Publication Data
US 2024/0080878 A1     Mar. 7, 2024

Related U.S. Application Data

(60) Provisional application No. 63/138,784, filed on Jan. 18, 2021.

(51) Int. Cl.
*H04W 72/566* (2023.01)
*H04W 72/11* (2023.01)

(52) U.S. Cl.
CPC .......... *H04W 72/569* (2023.01); *H04W 72/11* (2023.01)

(58) Field of Classification Search
CPC . H04W 72/569; H04W 72/11; H04W 72/042; H04W 72/23; H04W 72/10;
(Continued)

(56) References Cited

U.S. PATENT DOCUMENTS

2021/0136795 A1* 5/2021 Saber ................... H04W 72/02
2021/0168783 A1* 6/2021 Islam ................... H04L 5/0053
(Continued)

FOREIGN PATENT DOCUMENTS

WO        2017078465 A1     5/2017
WO    WO 2020033660 A1 *  2/2020

OTHER PUBLICATIONS

International Search Report and Written Opinion of the International Searching Authority, PCT/EP2022/050926, mailed May 16, 2022, 10 pages.
(Continued)

*Primary Examiner* — Rushil P. Sampat
(74) *Attorney, Agent, or Firm* — Sage Patent Group

(57) ABSTRACT

A method performed by user equipment, UE, includes receiving a DL reception and transmitting an UL transmission, wherein there is a collision between the DL reception and the UL transmission. The method also includes prioritizing for processing the DL reception or the UL transmission by applying a particular prioritization rule of a plurality of prioritization rules depending upon a type of the DL reception and/or the UL transmission. The method further includes processing the DL reception or the UL transmission in response to applying the particular prioritization rule.

20 Claims, 20 Drawing Sheets

(58) Field of Classification Search

CPC . H04W 72/1268; H04W 72/14; H04W 72/56; H04L 5/0091; H04L 1/1812; H04L 5/0053

See application file for complete search history.

(56) References Cited

U.S. PATENT DOCUMENTS

| | | | | |
|---|---|---|---|---|
| 2023/0189255 A1* | 6/2023 | Bagheri | H04L 1/1812 | 370/329 |
| 2023/0189260 A1* | 6/2023 | Bae | H04W 72/23 | 370/329 |

OTHER PUBLICATIONS

Asia Pacific Telecom, Discussion on potential UE complexity reduction features, 3GPP TSG-RAN WG1 Meeting #101, R1-2004536, e-Meeting, May 25-Jun. 5, 2020, 3 pages.

Ericsson, "PUR—Remaining open issues," 3GPP TSG-RAN WG2 #108, Tdoc R2-1915407, Reno, Nevada, United States, Nov. 18-22, 2019, 7 pages.

LG Electronics, "HD-FDD support for low-cost MTC," 3GPP TSG RAN WG1 Meeting #76bis, R1-141334, Shenzhen, China, Mar. 31-Apr. 4, 2014, 4 pages.

3GPP TS 36.211 v16.4.0 (Dec. 2020); 3rd Generation Partnership Project; Technical Specification Group Radio Access Network; Evolved Universal Terrestrial Radio Access (E-UTRA); Physical channels and modulation (Release 16), 250 pages.

3GPP TS 38.211 v16.4.0 (Dec. 2020); 3rd Generation Partnership Project; Technical Specification Group Radio Access Network; NR; Physical channels and modulation (Release 16), 133 pages.

Ericsson et al., "New WID on support of reduced capability NR devices," 3GPP TSG RAN Meeting #90e, RP-202933, Electronic Meeting, Dec. 7-11, 2022, 5 pages.

3GPP TR 38.875 v1.0.0 (Dec. 2020); 3rd Generation Partnership Project; Technical Specification Group Radio Access Network; Study on support of reduced capability NR devices (Release 17), 112 pages.

3GPP TS 38.214 v16.4.0 (Dec. 2020); 3rd Generation Partnership Project; Technical Specification Group Radio Access Network; NR; Physical layer procedures for data (Release 16), 169 pages.

Nokia et al., "Maintenance of Rel-16 URLLC UCI enhancements," R1-2001695, 3GPP TSG RAN WG1 Meeting #100bis-e, e-Meeting, Apr. 20 - 30, 2020, 27 pages.

* cited by examiner

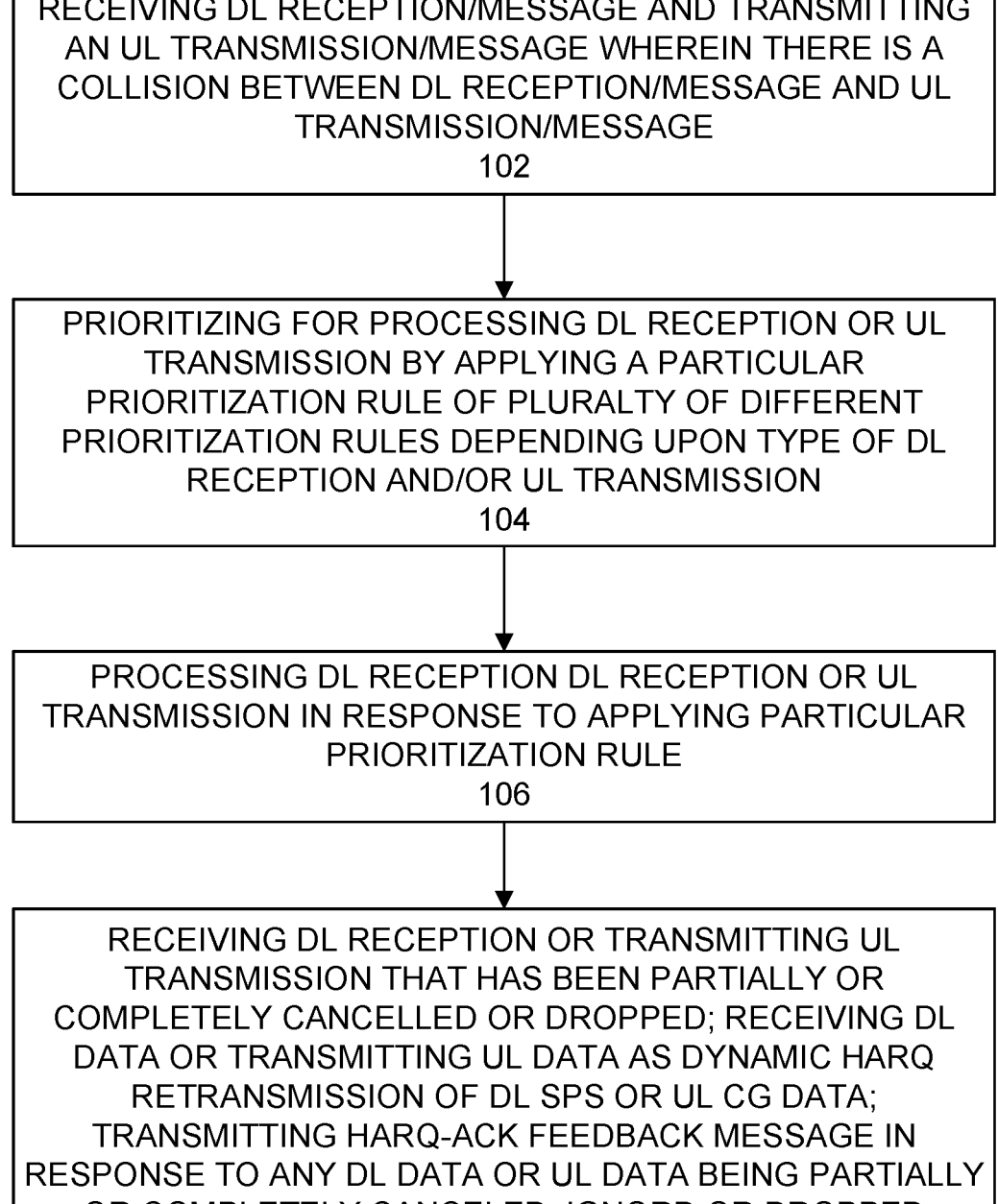

RECEIVING DL RECEPTION/MESSAGE AND TRANSMITTING AN UL TRANSMISSION/MESSAGE WHEREIN THERE IS A COLLISION BETWEEN DL RECEPTION/MESSAGE AND UL TRANSMISSION/MESSAGE
102

PRIORITIZING FOR PROCESSING DL RECEPTION OR UL TRANSMISSION BY APPLYING A PARTICULAR PRIORITIZATION RULE OF PLURALTY OF DIFFERENT PRIORITIZATION RULES DEPENDING UPON TYPE OF DL RECEPTION AND/OR UL TRANSMISSION
104

PROCESSING DL RECEPTION DL RECEPTION OR UL TRANSMISSION IN RESPONSE TO APPLYING PARTICULAR PRIORITIZATION RULE
106

RECEIVING DL RECEPTION OR TRANSMITTING UL TRANSMISSION THAT HAS BEEN PARTIALLY OR COMPLETELY CANCELLED OR DROPPED; RECEIVING DL DATA OR TRANSMITTING UL DATA AS DYNAMIC HARQ RETRANSMISSION OF DL SPS OR UL CG DATA; TRANSMITTING HARQ-ACK FEEDBACK MESSAGE IN RESPONSE TO ANY DL DATA OR UL DATA BEING PARTIALLY OR COMPLETELY CANCELED, IGNORD OR DROPPED
108

Figure 1

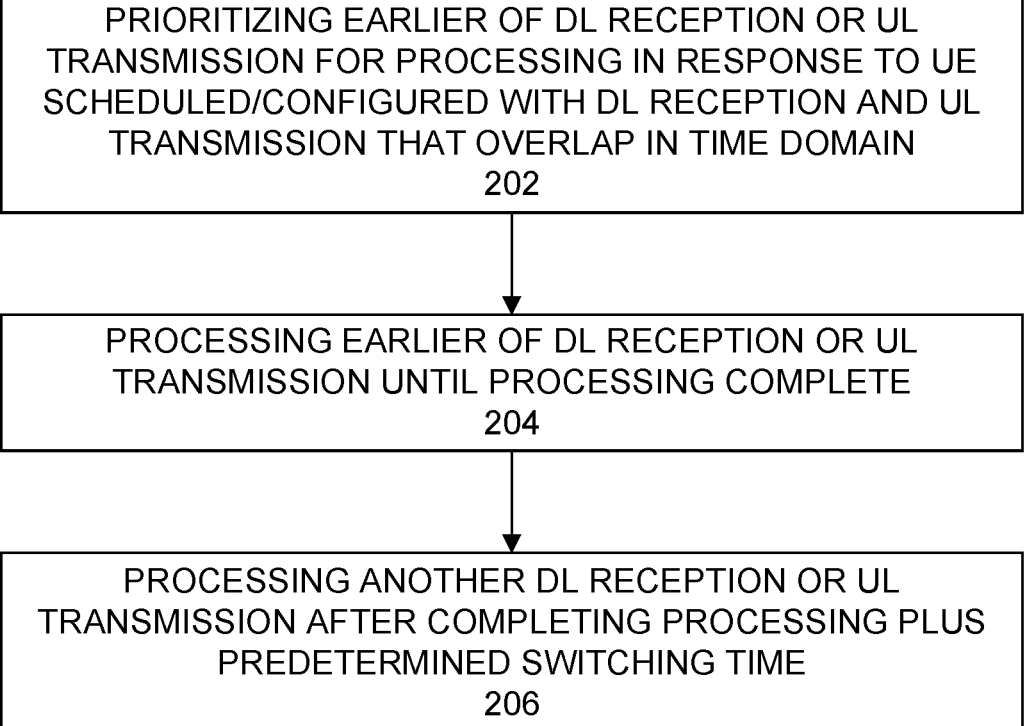

PRIORITIZING EARLIER OF DL RECEPTION OR UL TRANSMISSION FOR PROCESSING IN RESPONSE TO UE SCHEDULED/CONFIGURED WITH DL RECEPTION AND UL TRANSMISSION THAT OVERLAP IN TIME DOMAIN
202

PROCESSING EARLIER OF DL RECEPTION OR UL TRANSMISSION UNTIL PROCESSING COMPLETE
204

PROCESSING ANOTHER DL RECEPTION OR UL TRANSMISSION AFTER COMPLETING PROCESSING PLUS PREDETERMINED SWITCHING TIME
206

Figure 2

PRIORITIZING DL RECEPTION OR UL TRANSMISSION WHICH IS SCHEDULED LATER IN TIME IN RESPONSE TO UE BEING DYNAMICALLY SCHEDULED WITH DL RECEPTION AND UL TRANSMISSION WHICH OVERLAP IN TIME 302

CANCELLING PROCESSING OF DL RECEPTION OR UL TRANSMISSION SCHEDULED EARLIER IN TIME 304

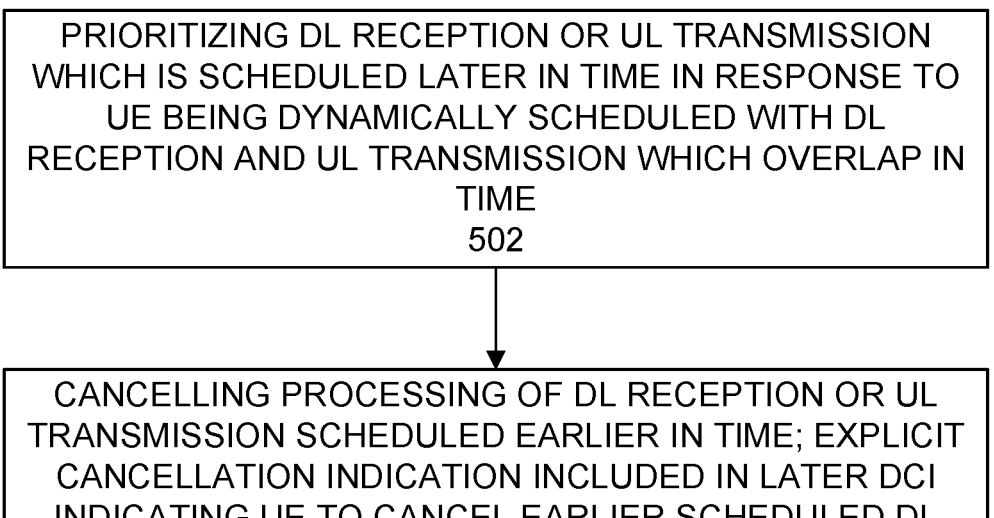

PRIORITIZING DL RECEPTION OR UL TRANSMISSION WHICH IS SCHEDULED LATER IN TIME IN RESPONSE TO UE BEING DYNAMICALLY SCHEDULED WITH DL RECEPTION AND UL TRANSMISSION WHICH OVERLAP IN TIME
502

CANCELLING PROCESSING OF DL RECEPTION OR UL TRANSMISSION SCHEDULED EARLIER IN TIME; EXPLICIT CANCELLATION INDICATION INCLUDED IN LATER DCI INDICATING UE TO CANCEL EARLIER SCHEDULED DL RECEPTION OR UL TRANSMISSION
504

Figure 5

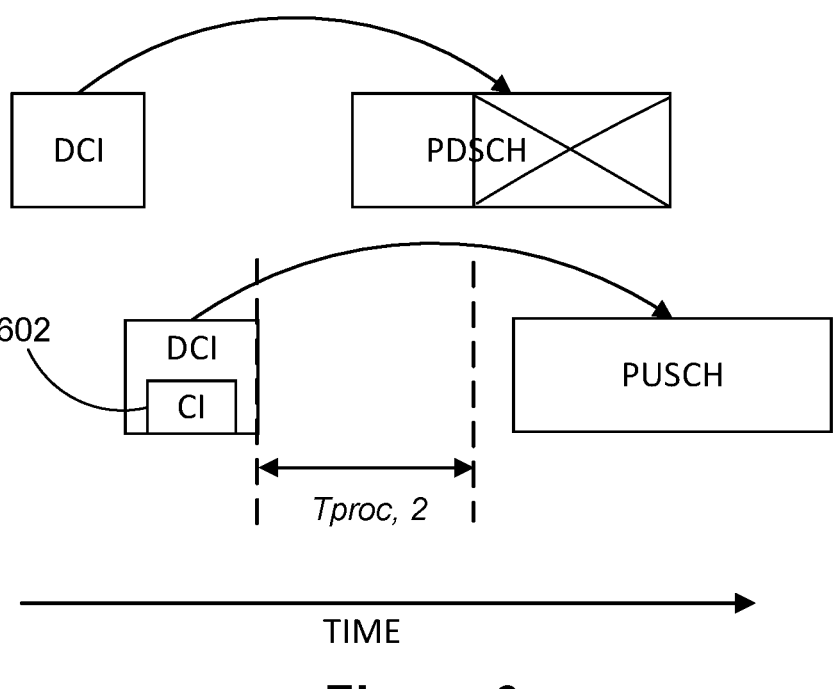

DCI

PDSCH

602

DCI

CI

PUSCH $Tproc, 2$

TIME

Figure 6

PRIORITIZING DYNAMICALLY SCHEDULED DL RECEPTION BY UE IN RESPONSE TO UE BEING DYNAMICALLY SCHEDULED WITH DL RECEPTION AND SEMI-STATICALLY CONFIGURED (CG) WITH UL TRANSMISSION OCCASION WHICH OVERLAP IN TIME
702

CANCELING UL TRANSMISSION IF UL TRANSMISSION OCCASION STARTS LATER THAN Tproc, 2 AFTER END OF DCI SCHEDULING DL RECEPTION; IF UL TRANSMISSION OCCASION DOES NOT START LATER THAN Tproc, 2 AFTER END OF DCI SCHEDULING DL RECEPTION, UE PRIORITIZES PROCESSING EARLIER TRANSMISSION OR RECEPTION, OR ALTERNATIVELY, UE DOES NOT EXPECT TO RECEIVE DYNAMICALLY SCHEDULED DL RECEPTION
704

Figure 7

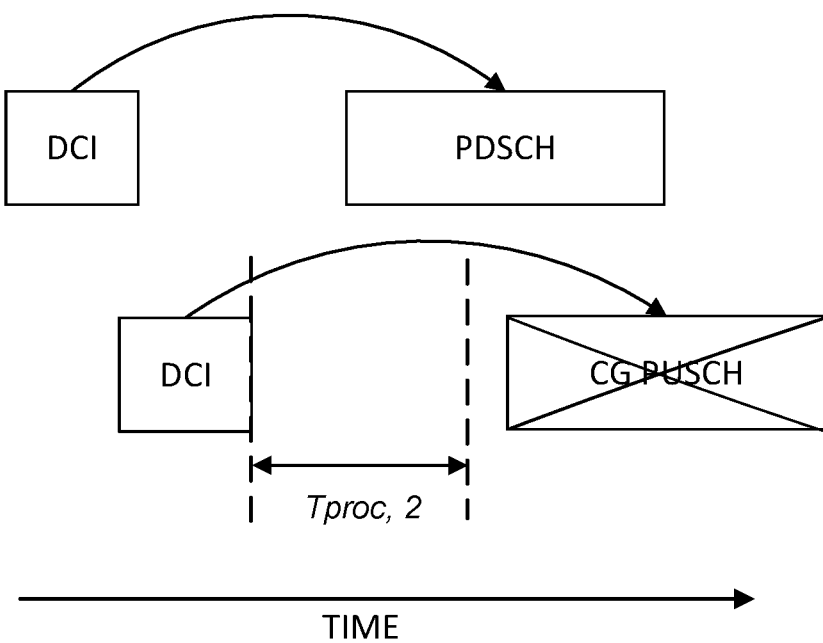

Figure 8

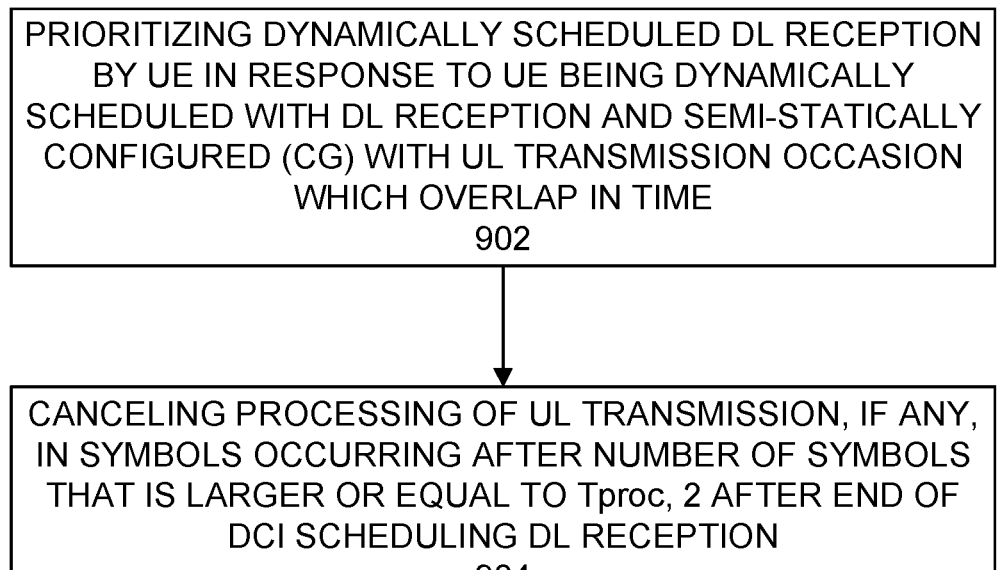

PRIORITIZING DYNAMICALLY SCHEDULED DL RECEPTION BY UE IN RESPONSE TO UE BEING DYNAMICALLY SCHEDULED WITH DL RECEPTION AND SEMI-STATICALLY CONFIGURED (CG) WITH UL TRANSMISSION OCCASION WHICH OVERLAP IN TIME
902

CANCELING PROCESSING OF UL TRANSMISSION, IF ANY, IN SYMBOLS OCCURRING AFTER NUMBER OF SYMBOLS THAT IS LARGER OR EQUAL TO Tproc, 2 AFTER END OF DCI SCHEDULING DL RECEPTION
904

Figure 9

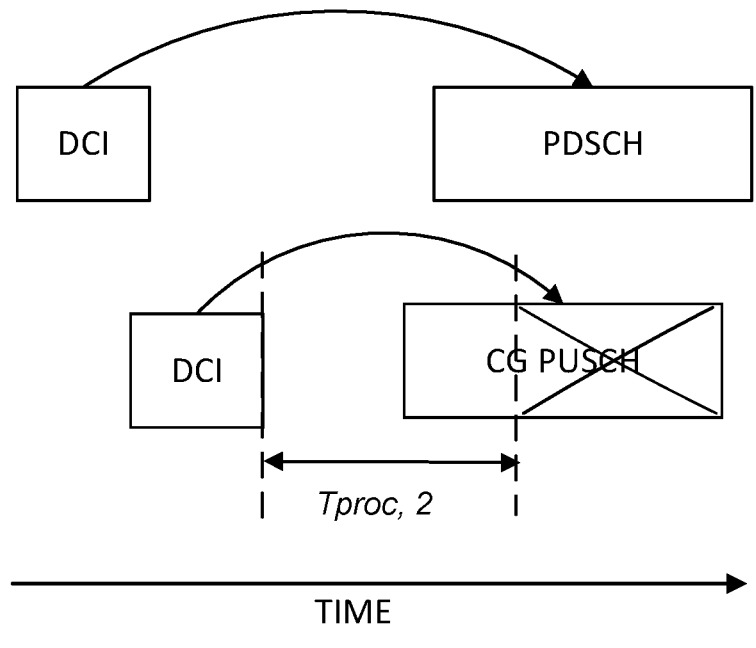

DCI

PDSCH

DCI

CG PUSCH

Tproc, 2

TIME

Figure 10

PRIORITIZING BY UE DYNAMICALLY SCHEDULED UL TRANSMISSION IN RESPONSE TO UE BEING DYNAMICALLY SCHEDULED WITH UL TRANSMISSION AND SEMI-STATICALLY CONFIGURED WITH DL RECEPTION OCCASION WHICH OVERLAP IN TIME
1202

IGNORING OR CANCELLING PROCESSING OF DL RECEPTION OCCASION IF DL RECEPTION OCCASION STARTS LATER THAN Tproc, 2 AFTER END OF DCI; OTHERWISE, UE PRIORITIZES PROCESSING OF EARLIER TRANSMISSION OR RECEPTION, OR ALTERNATIVELY, UE DOES NOT EXPECT TO TRANSMIT DYNAMICALLY SCHEDULED UL TRANSMISSION
1204

Figure 11

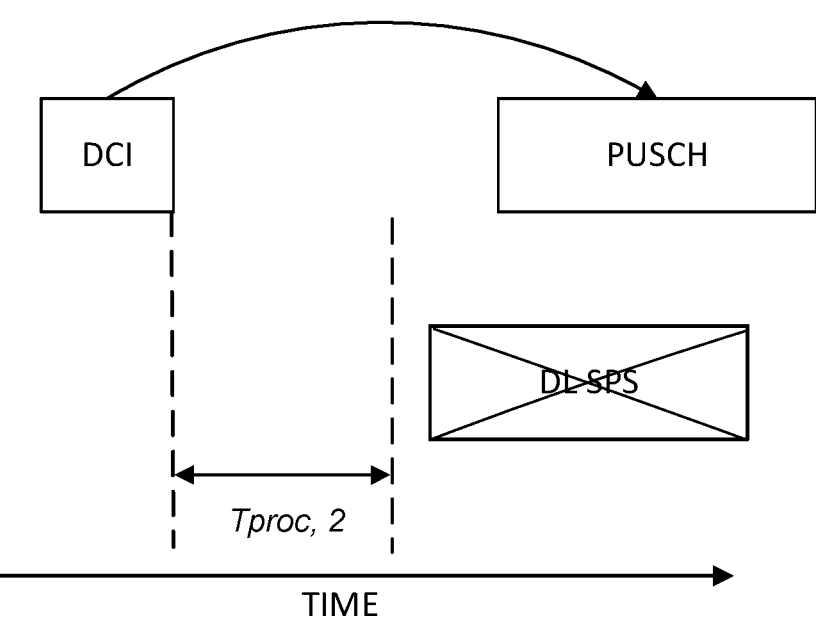

Figure 12

PRIORITIZING BY UE DYNAMICALLY SCHEDULED UL TRANSMISSION IN RESPONSE TO UE BEING DYNAMICALLY SCHEDULED WITH UL TRANSMISSION AND SEMI-STATICALLY CONFIGURED WITH DL RECEPTION OCCASION WHICH OVERLAP IN TIME
1302

CANCELING PROCESSING OF DL RECEPTION OCCASION IN SYMBOLS THAT OCCUR AFTER NUMER OF SYMBOLS LARGER OR EQUAL TO Tproc, 2
1304

TIME

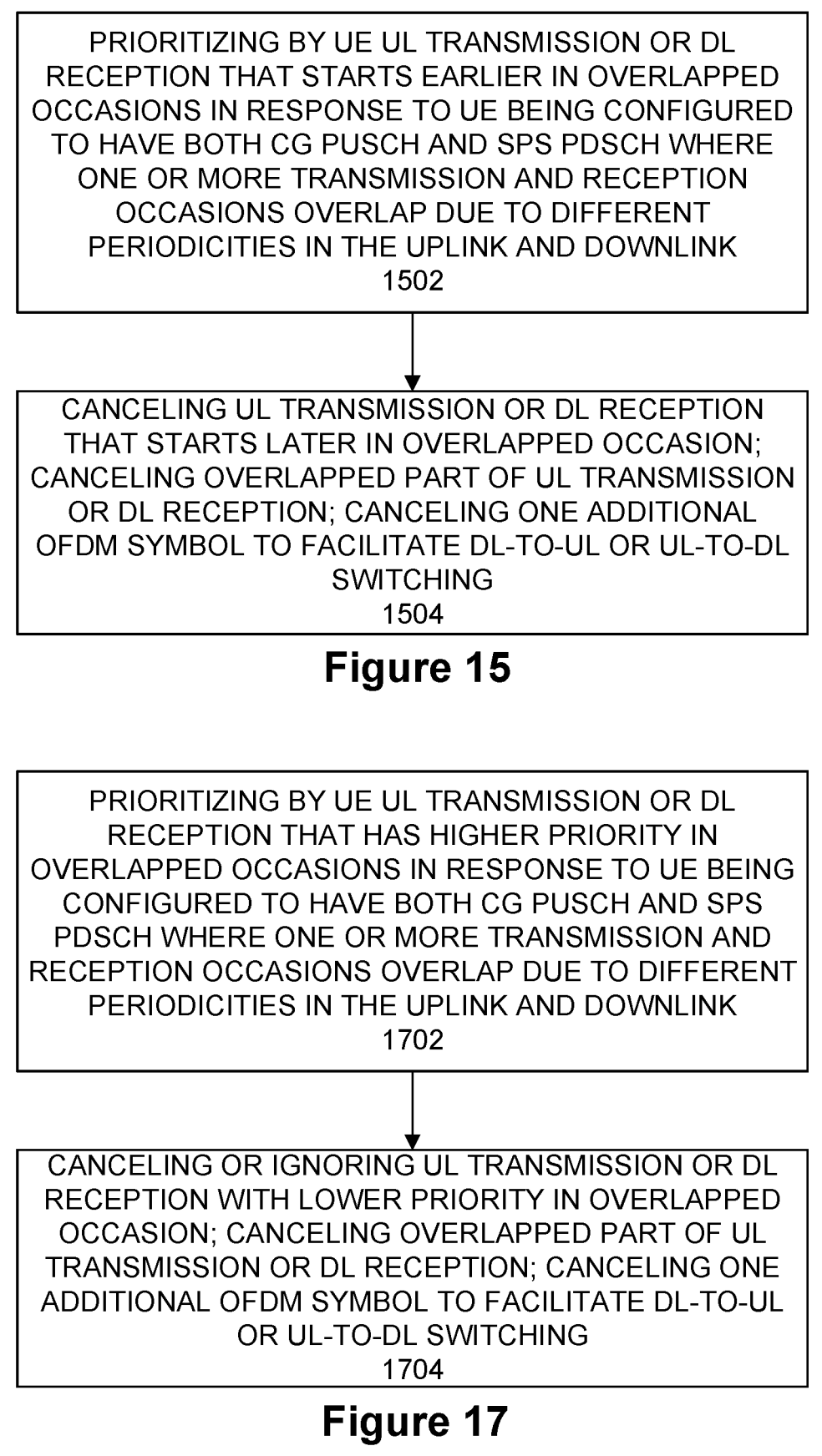

PRIORITIZING BY UE UL TRANSMISSION OR DL RECEPTION THAT STARTS EARLIER IN OVERLAPPED OCCASIONS IN RESPONSE TO UE BEING CONFIGURED TO HAVE BOTH CG PUSCH AND SPS PDSCH WHERE ONE OR MORE TRANSMISSION AND RECEPTION OCCASIONS OVERLAP DUE TO DIFFERENT PERIODICITIES IN THE UPLINK AND DOWNLINK
1502

CANCELING UL TRANSMISSION OR DL RECEPTION THAT STARTS LATER IN OVERLAPPED OCCASION; CANCELING OVERLAPPED PART OF UL TRANSMISSION OR DL RECEPTION; CANCELING ONE ADDITIONAL OFDM SYMBOL TO FACILITATE DL-TO-UL OR UL-TO-DL SWITCHING
1504

Figure 15

PRIORITIZING BY UE UL TRANSMISSION OR DL RECEPTION THAT HAS HIGHER PRIORITY IN OVERLAPPED OCCASIONS IN RESPONSE TO UE BEING CONFIGURED TO HAVE BOTH CG PUSCH AND SPS PDSCH WHERE ONE OR MORE TRANSMISSION AND RECEPTION OCCASIONS OVERLAP DUE TO DIFFERENT PERIODICITIES IN THE UPLINK AND DOWNLINK
1702

CANCELING OR IGNORING UL TRANSMISSION OR DL RECEPTION WITH LOWER PRIORITY IN OVERLAPPED OCCASION; CANCELING OVERLAPPED PART OF UL TRANSMISSION OR DL RECEPTION; CANCELING ONE ADDITIONAL OFDM SYMBOL TO FACILITATE DL-TO-UL OR UL-TO-DL SWITCHING
1704

Figure 17

HANDLING DOWNLINK AND UPLINK COLLISIONS IN HALF DUPLEX FREQUENCY DIVISION DUPLEX USER EQUIPMENT

CROSS REFERENCE TO RELATED APPLICATIONS

This application is a 35 U.S.C. § 371 national stage application of PCT International Application No. PCT/EP2022/050926 filed on Jan. 17, 2022, which in turn claims domestic priority to U.S. Provisional Patent Application No. 63/138,784, filed on Jan. 18, 2021, the disclosures and content of which are incorporated by reference herein in their entirety.

TECHNICAL FIELD

The present disclosure relates generally to communications, and more particularly to communication methods and related devices and nodes supporting wireless communications.

BACKGROUND

Existing user equipment (UE) behavior in handling downlink and uplink (DL/UL) collision for a non-full-duplex UE is to always prioritize the earlier transmission/reception. In some scenarios, this behavior is not desirable, and a new UE behavior is preferred instead. For example, when there is a collision between a dynamically scheduled DL reception and an UL configured grant (CG) occasion, the current UE behavior cannot ensure that the dynamically scheduled DL reception is prioritized.

SUMMARY

The embodiments described herein provide solutions for different UE behaviors, e.g., half-duplex frequency-division duplex (HD-FDD) UE behaviors, in handling DL/UL collision where the UE does not always prioritize the earlier transmission/reception. Depending on types of UL transmission/DL reception, e.g., dynamically scheduled or semi-statically configured, different prioritization rules can apply. The invention also includes solutions where a timeline for prioritization is considered.

The solutions described herein enable the UE to handle a DL/UL collision scenario in HD-FDD operation in a more flexible manner. The UE behavior may differ in different collision scenarios so that the outcome is appropriate, e.g., as intended by a scheduler.

Some embodiments provide a method performed by user equipment, UE, for handling downlink (DL) and uplink (UL) collisions. The method includes receiving a DL reception and transmitting an UL transmission, wherein there is a collision between the DL reception and the UL transmission, and the method also includes prioritizing for processing the DL reception or the UL transmission by applying a particular prioritization rule of a plurality of prioritization rules depending upon a type of the DL reception and/or the UL transmission, and the method further includes processing the DL reception or the UL transmission in response to applying the particular prioritization rule.

In some embodiments and any of the preceding embodiments, prioritizing for processing the DL reception or UL transmission includes prioritizing an earlier of the DL reception or the UL transmission, and the method further includes processing the earlier of the DL reception or the UL transmission until the processing is complete and processing another DL reception or UL transmission after completing the processing of the earlier of the DL reception or the UL transmission plus a predetermined switching time.

In some embodiments and any of the preceding embodiments, prioritizing for processing the DL reception or UL transmission includes prioritizing the DL reception or the UL transmission which is scheduled later in time in response to the UE being dynamically scheduled with the DL reception and the UL transmission which overlap in the time domain, and the method further includes canceling processing of the DL reception, or the UL transmission scheduled earlier in time.

In some embodiments and any of the preceding embodiments, DCI of the DL reception or the UL transmission which is scheduled later in time includes an explicit cancellation indication to indicate to the UE to cancel an earlier scheduled one of the UL transmission or the DL reception.

In some embodiments and any of the preceding embodiments, prioritizing for processing the DL reception or UL transmission includes prioritizing a dynamically scheduled DL reception by the UE in response to the UE being dynamically scheduled with the DL reception and semi-statically configured with a UL transmission occasion which overlap in time, and the method further includes canceling the UL transmission if the UL transmission occasion starts later than Tproc, 2 after an end of the DCI scheduling the DL reception.

In some embodiments and any of the preceding embodiments, the UE prioritizes processing an earlier of the UL transmission or the DL reception in response to the UL transmission occasion not starting later than Tproc, 2 after the end of the DCI scheduling the DL reception, or alternatively, the UE does not expect to receive the dynamically scheduled DL reception.

In some embodiments and any of the preceding embodiments, prioritizing for processing the DL reception or UL transmission includes prioritizing a dynamically scheduled DL reception in response to the UE being dynamically scheduled with the DL reception and semi-statically configured with a UL transmission occasion which overlap in time, and the method further canceling processing of the UL transmission, if any, in symbols occurring after a number of symbols that is larger than or equal to Tproc, 2 after an end of DCI scheduling the DL reception.

In some embodiments and any of the preceding embodiments, prioritizing for processing the DL reception or UL transmission includes prioritizing by the UE a dynamically scheduled UL transmission in response to the UE being dynamically scheduled with the UL transmission and semi-statically configured with the DL reception occasion which overlap in time, and the method further including ignoring or canceling processing of the DL reception occasion if the DL reception starts later than Tproc, 2 after the end of the DCI, otherwise, the UE prioritizes processing an earlier transmission or reception, or alternatively, the UE does not expect to transmit the dynamically scheduled UL transmission.

In some embodiments and any of the preceding embodiments, prioritizing for processing the DL reception or UL transmission includes prioritizing by the UE dynamically scheduled UL transmission in response to the UE being dynamically scheduled with the UL transmission and semi-statically configured with a DL reception occasion which overlap in time, and the method further includes canceling or ignoring processing of the DL reception occasion in symbols that occur after a number of symbols larger than or equal to Tproc, 2.

In some embodiments and any of the preceding embodiments, prioritizing for processing the DL reception or UL transmission includes prioritizing by the UE the UL transmission or the DL reception that starts earlier in overlapped occasions in response to the UE being configured to have both CG PUSCH and SPS PDSCH where one or more transmission and reception occasions overlap due to different periodicities in the uplink and the downlink, and the method further includes canceling or ignoring the UL transmission or DL reception that starts later in the overlapped occasion.

In some embodiments and any of the preceding embodiments, canceling or ignoring the UL transmission or the DL reception includes canceling an overlapped part of the UL transmission or DL reception.

In some embodiments and any of the preceding embodiments, canceling or ignoring the UL transmission or the DL reception includes canceling at least one additional OFDM symbol to facilitate a downlink-to-uplink or an uplink-to-downlink switching.

In some embodiments and any of the preceding embodiments, prioritizing for processing the DL reception or UL transmission includes prioritizing by the UE the UL transmission or the DL reception that has a higher priority in overlapped occasions in response to the UE being configured to have both CG PUSCH and SPS PDSCH where one or more transmission and reception occasions overlap due to different periodicities in the uplink and the downlink, and the method further includes canceling or ignoring the UL transmission or the DL reception with a lower priority in an overlapped occasion.

In some embodiments and any of the preceding embodiments, the method further includes receiving, by the UE, any DL reception from a network node, or transmitting, by the UE, any UL transmission to a network node, that has been partially or completely canceled, ignored, or dropped.

In some embodiments and any of the preceding embodiments, the method further includes receiving any DL data, or transmitting any UL data as a dynamic HARQ retransmission.

In some embodiments and any of the preceding embodiments, the method further includes transmitting, by the UE, a HARQ-ACK feedback message in response to any DL data or any UL data being partially or completely canceled, ignored, or dropped by the UE.

Some embodiments include a communication device that includes processing circuitry and a memory coupled with the processing circuitry. The memory includes instructions that when executed by the processing circuitry causes the communication device to perform operations according to any of the described embodiments.

Some embodiments include a communication device adapted to perform according to any of the described embodiments.

Some embodiments include a computer program including program code to be executed by processing circuitry of a communication device, whereby execution of the program code causes the communication device to perform operations according to any of the described embodiments.

Some embodiments include a computer program product include a non-transitory storage medium including program code to be executed by processing circuitry of a communication device, whereby execution of the program code causes the communication device to perform operations according to any of the described embodiments.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a flow chart of an example of a method for handling downlink and uplink collisions by user equipment according to some embodiments of inventive concepts;

FIG. 2 is a flow chart of an example of a method for applying a prioritization rule by user equipment for handling downlink and uplink collisions according to some embodiments of inventive concepts;

FIG. 5 is a flow chart of an example of a method for applying another prioritization rule by user equipment for handling downlink and uplink collisions according to some embodiments of inventive concepts;

FIG. 6 is an illustration of the method of FIG. 5;

FIG. 7 is a flow chart of an example of a method for applying another prioritization rule by user equipment for handling downlink and uplink collisions according to some embodiments of inventive concepts;

FIG. 8 is an illustration of the method of FIG. 7;

FIG. 9 is a flow chart of an example of a method for applying another prioritization rule by user equipment for handling downlink and uplink collisions according to some embodiments of inventive concepts;

FIG. 10 is an illustration of the method of FIG. 9;

FIG. 11 is a flow chart of an example of a method for applying another prioritization rule by user equipment for handling downlink and uplink collisions according to some embodiments of inventive concepts;

FIG. 12 is an illustration of the method of FIG. 11;

FIG. 15 is a flow chart of an example of a method for applying another prioritization rule by user equipment for handling downlink and uplink collisions according to some embodiments of inventive concepts;

FIG. 17 is a flow chart of an example of a method for applying another prioritization rule by user equipment for handling downlink and uplink collisions according to some embodiments of inventive concepts;

DETAILED DESCRIPTION

Figure 3:
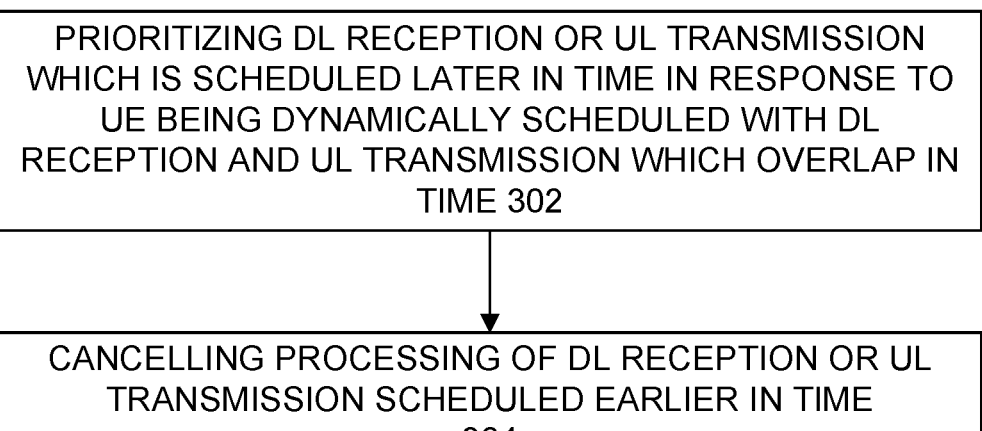
FIG. 3 is a flow chart of an example of a method for applying another prioritization rule by user equipment for handling downlink and uplink collisions according to some embodiments of inventive concepts.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The next paradigm shift in processing and manufacturing is the Industry 4.0 in which factories are automated and made much more flexible and dynamic with the help of wireless connectivity. This includes real-time control of robots and machines using time-critical machine-type communication (cMTC) and improved observability, control, and error detection with the help of large numbers of more simple actuators and sensors (massive machine-type communication or mMTC). For cMTC support, ultra-reliable low latency communications (URLLC) were introduced in 3GPP Release 15 for both LTE and NR, and NR URLLC is further enhanced in Release 16 within the enhanced URLLC (eURLLC) and Industrial IoT work items.

For mMTC and low power wide area (LPWA) support, 3GPP introduced both narrowband Internet-of-Things (NB-IoT) and long-term evolution for machine-type communication (LTE-MTC, or LTE-M) in Release 13. These technologies have been further enhanced through all releases up until and including the ongoing Release 16 work.

NR (New Radio) was introduced in 3GPP Release 15 and focused mainly on the enhanced mobile broadband (eMBB) and cMTC. However, there are still several other use cases whose requirements are higher than LPWAN (i.e., LTEM/NB-IoT) but lower than URLLC and eMBB [1]. In order to efficiently support such use cases which are in-between eMBB, URLLC, and mMTC, the 3GPP has studied reduced capability NR devices (NR-RedCap) in Release 17 [2]. The RedCap as a study item has been completed in December 2020 and is going to continue as a work item [1]. The NR-RedCap user equipments (UEs) are designed to have lower cost, lower complexity, a longer battery life which can potentially enable a smaller form factor than legacy NR UEs. For RedCap UEs, different complexity reduction features including reduced bandwidth, reduced number of antennas, and support of half-duplex (HD) FDD type-A (similarly as defined in LTE) operation have been considered.

In LTE FDD, there are two half duplex types, Type A and Type B, defined for a UE which cannot perform simultaneous transmission and reception. To support this, a guard period is created as a gap between a DL reception and subsequent UL transmission, and vice versa. Relevant part of the LTE specification [3] is copied below.

For type A half-duplex FDD operation, a guard period is created by the UE by not receiving the last part of a downlink subframe immediately preceding an uplink subframe from the same UE.

For type B half-duplex FDD operation, guard periods, each referred to as a half-duplex guard subframe, are created by the UE by not receiving a downlink subframe immediately preceding an uplink subframe from the same UE, and not receiving a downlink subframe immediately following an uplink subframe from the same UE.

HD-FDD type A was introduced in LTE where it is specified that a guard period is created by the UE as the last part of a DL subframe when switching from reception in DL subframe to transmission in an UL subframe. For the case of switching from UL transmission to DL reception, due to timing advance, there will be a small gap between an UL subframe and the next DL subframe which can be used as a guard period. Note that a UE supporting HD-FDD Type A is typically equipped with separate oscillators for DL and UL and thus does not require much frequency retuning time when switching the UL/DL direction.

HD-FDD Type B was introduced for LTE-M where a longer guard period is created by the UE when switching from DL reception to UL transmission, and vice versa.

In the NR specification [4], there exist definitions for DL-to-UL and UL-to-DL switching time for a UE which is not capable of full-duplex communication and not supporting simultaneous transmission and reception, so called "non-full-duplex UEs".

Section 4.3.2, TS 38.211, V16.4.0

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to transmit in the uplink in one cell within the group of cells earlier than $N\_\text{"Rx-Tx"}$ $T\_\text{"c"}$ after the end of the last received downlink symbol in the same or different cell within the group of cells where N_"Rx-Tx" is given by Table 4.3.2-3.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to receive in the downlink in one cell within the group of cells earlier than N_"Tx-Rx" T_"c" after the end of the last transmitted uplink symbol in the same or different cell within the group of cells where N_"Tx-Rx" is given by Table 4.3.2-3.

A UE not capable of full-duplex communication is not expected to transmit in the uplink earlier than N_"Rx-Tx" T_"c" after the end of the last received downlink symbol in the same cell where N_"Rx-Tx" is given by Table 4.3.2-3.

A UE not capable of full-duplex communication is not expected to receive in the downlink earlier than N_"Tx-Rx" T_"c" after the end of the last transmitted uplink symbol in the same cell where N_"Tx-Rx" is given by Table 4.3.2-3.

TABLE 4.3.2-3

Transition time $N_{Rx-Tx}$ and $N_{Tx-Rx}$

| Transition time | FR1 | FR2 |
| --- | --- | --- |
| $N_{Tx-Rx}$ | 25600 | 13792 |
| $N_{Rx-Tx}$ | 25600 | 13792 |

Sections 4.1 and 4.2, TS 38.211, V16.4.0

Throughout this specification, unless otherwise noted, the size of various fields in the time domain is expressed in time units $T_c=1/(\Delta f_{max} \cdot n_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

TABLE 4.2-1

Supported transmission numerologies.

| $\mu$¤ | $\Delta f = 2^\mu \cdot 15[kHz]$¤ | Cyclic prefix¤ | ¤ |
| --- | --- | --- | --- |
| 0¤ | 15¤ | Normal¤ | ¤ |
| 1¤ | 30¤ | Normal¤ | ¤ |
| 2¤ | 60¤ | Normal, Extended¤ | ¤ |
| 3¤ | 120¤ | Normal¤ | ¤ |
| 4¤ | 240¤ | Normal¤ | ¤ |

These switching time definitions apply to DL reception and UL transmission both in the same cell or on different cells within a cell group including inter-band CA, NR-DC (NR dual connectivity), or SUL scenarios. The switching time N_"Rx-Tx" T_"c" and N_"Tx-Rx" T_"c" defined for FR1 are the same and is equal to 13.02 µs, which is less than the duration of one OFDM symbol for 15, 30, and 60 kHz SCS.

In addition to the switching time definition, the description of non-full-duplex UE in the specification [4] also captures UE behavior on handling potential DL/UL collision.

A UE not capable of full-duplex communication is not expected to transmit in the uplink earlier than $N_{Rx-Tx}T_c$ after the end of the last received downlink symbol in the same cell where $N_{Rx-Tx}$ is given by Table 4.3.2-3.

A UE not capable of full-duplex communication is not expected to receive in the downlink earlier than $N_{Tx-Rx}T_c$ after the end of the last transmitted uplink symbol in the same cell where $N_{Tx-Rx}$ is given by Table 4.3.2-3.

From the above specification text, it can be understood that the non-full-duplex UE would prioritize the earlier reception/transmission if there is a collision (overlap in time) between DL reception and UL transmission. For example, if there would be an overlap in time between an earlier DL reception and a later UL transmission, the UE processes the earlier DL reception until the end and does not process the later UL transmission at least until $N_{Rx-Tx}$ $T_c$ after the end of the earlier DL reception.

The embodiments are described herein using generic terms of DL reception and UL transmission. DL reception can include physical DL channels or signals such as PDSCH, PDCCH, SSB, and CSI-RS. Similarly, UL transmission can include physical UL channels or signals such as PUSCH, PUCCH, SR, and SRS. When DL reception or UL transmission is described as being dynamically scheduled or semi-statically configured, it can therefore cover all the mentioned physical channels and signals.

In accordance with some examples, the embodiments and solutions described herein are applicable to NR HD-FDD UEs which also include NR HD-FDD Type-A UEs and are also applicable to other types of UEs. They provide UE behavior in handling DL/UL collision for HD-FDD UE.

FIG. 1 is a flow chart of an example of a method for handling downlink and uplink collisions by user equipment according to some embodiments of inventive concepts. In block 102, the method includes receiving a DL reception by the UE and transmitting an UL transmission by the UE, wherein there is a collision between the DL reception and the UL transmission. The collision between the DL reception and the UL transmission is defined by an overlap in time of the DL reception and the UL transmission. The DL reception may be a message or communication received by the UE from another node in a communications network as described herein. The UL transmission may be a message or communication transmitted by the UE to another node in a communications network as described herein.

In block 104, the method includes prioritizing for processing, by the UE, the DL reception or the UL transmission by applying a particular prioritization rule of a plurality of different rules depending upon a type of the DL reception and/or UL transmission as described in more detail herein.

In block 106, the method includes processing the DL reception and/or the UL transmission in response to applying the particular prioritization rule.

In block 108, the method includes receiving the DL reception or transmitting the UL transmission that has been partially or completely canceled or dropped. In some embodiments as described in more detail herein, the method includes receiving DL data or transmitting UL data as a dynamic Hybrid Automatic Repeat Request (HARQ) retransmission of DL SPS or UL CG data. In some examples as described herein, the method includes transmitting a HARQ-ACK feedback message in response to any DL data or UL data being partially or completely canceled, ignored, or dropped.

FIG. 2 is a flow chart of an example of a method for applying a prioritization rule by user equipment for handling downlink and uplink collisions according to some embodiments of inventive concepts. In block 202, the method includes prioritizing for processing by the UE an earlier one of the DL reception or the UL transmission in response to the UE being scheduled or configured with the DL reception and UL transmission that overlap in the time domain.

In block 204, the method includes processing the earlier of the DL reception or the UL transmission until the processing is complete.

In block 206, the method includes processing another DL reception or UL transmission after completing processing plus a predetermined switching time.

In the exemplary embodiment in FIG. 2, when a HD-FDD UE is scheduled/configured with DL reception and UL transmission which overlap in time domain, the UE prioritizes the earlier reception or transmission by processing the earlier reception or transmission until the end, and may process another transmission/reception only after the required switching time after the end of the earlier reception/transmission.

In addition to the above embodiment, other embodiments or solutions for different UE behaviors are provided in the following sections for different DL/UL collision scenarios.

1. Dynamically Scheduled DL Reception Vs. Dynamically Scheduled UL Transmission

FIG. 3 is a flow chart of an example of a method for applying another prioritization rule by the UE for handling downlink and uplink collisions according to some embodiments of inventive concepts. In block 302, the method includes prioritizing the DL reception or the UL transmission which is scheduled later in time in response to the UE being dynamically scheduled with the DL reception and the UL transmission which overlap in time.

In block 304, the method includes canceling the processing of the DL reception or the UL transmission scheduled earlier in time.

In accordance with examples of this embodiment, when a HD-FDD UE is dynamically scheduled with DL reception and UL transmission which overlap in time domain, the UE prioritizes the transmission or reception which is scheduled later by cancelling processing of the transmission or reception which is scheduled earlier.

A transmission or reception is considered as scheduled earlier than another reception or transmission if its scheduling Downlink Control Information (DCI) starts or ends earlier than that of another.

In one version of the above embodiment, the UE cancels the earlier scheduled transmission or reception in symbols which occur after N symbols after the end of the DCI scheduling another overlapping transmission or reception. The value N can be fixed in the specification or configured to a UE or reported by a UE as a capability signaling. The value N can be dependent on SCS configurations of the DL reception and UL transmission. In case that the SCS configurations are not the same, the value N is determined based on the smallest SCS configuration.

In case that the value N is fixed in the specification, it can be determined as a function of UE processing time for processing PDCCH, e.g., decoding DCI or for preparing PUSCH. As a preferred embodiment, the value N can be fixed to the UE PUSCH preparation procedure time $T_{proc,2}$ (sec) or $N_2$ (symbols) as defined in [5],Section 6.4.

In another version of the above embodiment, the UE cancels the earlier scheduled transmission or reception in symbols which occur after a number of symbols that is larger than and equal to $T_{proc,2}$, after the end of the DCI scheduling another overlapping transmission or reception.

Figure 4:
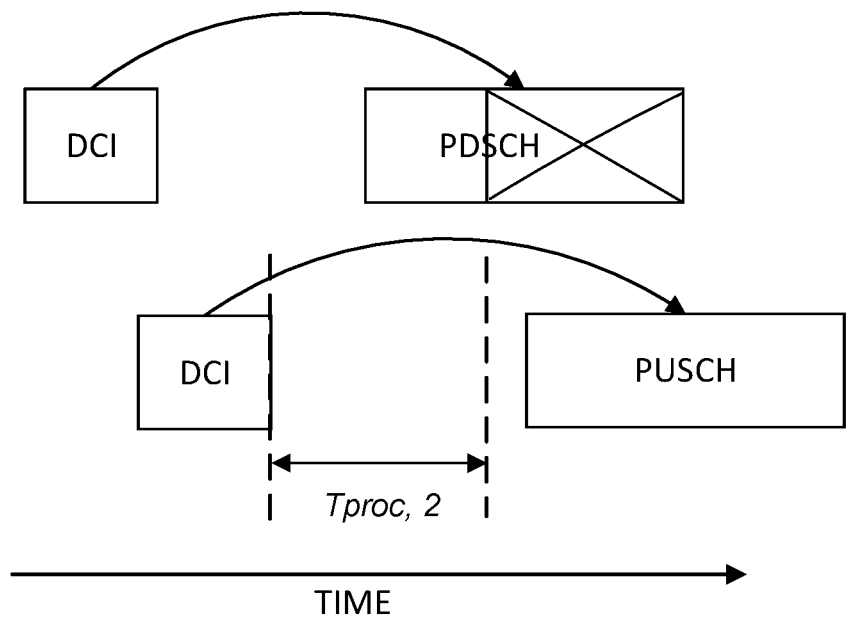
FIG. 4 is an illustration of the method of FIG. 3.

FIG. 4 illustrates an example of UE behaviors described in the above embodiments and is an illustration of the method of FIG. 3. FIG. 4 illustrates an example of a HD-FDD UE being dynamically scheduled with overlapping PDSCH and PUSCH where PDSCH is scheduled earlier (e.g., its DCI ends earlier). The UE cancels processing of PDSCH reception at symbols which occur after $T_{proc,2}$ after the end of the DCI scheduling the overlapping PUSCH.

FIG. 5 is a flow chart of an example of a method for applying another prioritization rule by user equipment for handling downlink and uplink collisions according to some embodiments of inventive concepts. In block 502, the method includes prioritizing the DL reception or the UL transmission which is scheduled later in time in response to the UE being dynamically scheduled with the DL reception and the UL transmission which overlap in time.

In block 504, the method includes canceling the processing of the DL reception or the UL transmission scheduled earlier in time. In accordance with an example, an explicit cancellation indication may be included in the later DCI indicating to the UE to cancel the earlier scheduled DL reception or UL transmission.

FIG. 6 is an illustration of the method of FIG. 5. FIG. 6 is also an example of a HD-FDD UE being dynamically scheduled with overlapping PDSCH and PUSCH where PDSCH is scheduled earlier (e.g., its DCI ends earlier). A cancellation indication (CI) 602 is included in the DCI scheduling the overlapping PUSCH (later DCI) indicating to the UE to cancel processing of PDSCH reception at symbols which occur after $T_{proc,2}$ after the end of the later DCI.

The dynamically scheduled UL transmission mentioned in the embodiments in this section may also include PUSCH msg3, scheduled by a Random-access response (RAR) in the random-access procedure. That is, PUSCH msg3, scheduled by RAR is treated as a dynamically scheduled UL transmission in the prioritization procedure in some embodiments.

2. Dynamically Scheduled DL Reception Vs. Semi-Statically Configured UL Transmission FIG. 7 is a flow chart of an example of a method for applying another prioritization rule by user equipment for handling downlink and uplink collisions according to some embodiments of inventive concepts. In block 702, the method includes prioritizing dynamically scheduled DL reception by the UE in response to the UE being dynamically scheduled with DL reception and semi-statically configured with an UL transmission occasion which overlap in time.

In block 704, the method includes canceling the UL transmission if the UL transmission occasion starts later than Tproc, 2 after end of the DCI scheduling DL reception. In some examples, if the UL transmission occasion does not start later than Tproc, 2 after the end of the DCI scheduling the DL reception, the UE prioritizes processing earlier transmission or reception, or alternatively, the UE does not expect to receive the dynamically scheduled DL reception.

In one embodiment, when a HD-FDD UE is dynamically scheduled with DL reception and semi-statically configured with UL transmission occasion which overlap in time domain, the UE prioritizes the dynamically scheduled DL reception.

In one version of the above embodiment, the UE prioritizes dynamically scheduled DL reception by cancelling the UL transmission if the UL transmission occasion starts later than Tproc, 2 after the end of the DCI scheduling DL reception. If the UL transmission occasion does not start later than Tproc, 2 after the end of the DCI scheduling DL reception, the UE prioritizes processing an earlier transmission or reception, or alternatively, the UE does not expect to receive the dynamically scheduled DL reception. This is illustrated in FIG. 8. FIG. 8 is an example of a HD-FDD UE being dynamically scheduled with PDSCH overlapping with a configured grant (CG) PUSCH occasion. Since the CG PUSCH occasion starts later than Tproc,2 after the end of the DCI scheduling PDSCH, the UE ignores CG PUSCH occasion or cancels CG PUSCH transmission, and only receives PDSCH. FIG. 8 is also an illustration of the exemplary method in FIG. 7. In some examples, the HD-FDD UE does not include a partially cancellation capability.

FIG. 9 is a flow chart of an example of a method for applying another prioritization rule by user equipment for handling downlink and uplink collisions according to some embodiments of inventive concepts. In block 902, the method includes prioritizing dynamically scheduled DL reception by the UE in response to the UE being dynamically scheduled with DL reception and semi-statically configured with UL transmission occasions which overlap in time.

In block 904, the method includes canceling processing of the UL transmission, if any, symbols occurring after a number of symbols that is larger or equal Tproc, 2 after the end of the DCI scheduling the DL reception.

In this embodiment, the UE prioritizes dynamically scheduled DL reception by cancelling processing of the UL transmission, if any, in symbols which occur after a number of symbols that is larger or equal to Tproc, 2. This is illustrated in FIG. 10.

FIG. 10 is an illustration of an example of a HD-FDD UE being dynamically scheduled with PDSCH overlapping with a configured grant (CG) PUSCH occasion. The UE cancels processing CG PUSCH transmission in symbols which occur after a number of symbols that is larger or equal to Tproc, 2. FIG. 10 is also an illustration of the exemplary method in FIG. 9. In some examples, the HD-FDD UE includes partial cancellation capability.

3. Dynamically Scheduled UL Transmission Vs. Semi-Statically Configured DL Reception FIG. 11 is a flow chart of an example of a method for applying another prioritization rule by user equipment for handling downlink and uplink collisions according to some embodiments of inventive concepts. In block 1202, the method includes prioritizing by the UE dynamically scheduled UL transmission in response to the UE being dynamically scheduled with UL transmission and semi-statically configured with a DL reception occasion which overlap in time.

In block 1204, the method includes ignoring or canceling processing of the DL reception occasion if the DL reception occasion starts later than Tproc, 2 after the end of the DCI scheduling the UL transmission. Otherwise, the UE prioritizes processing an earlier transmission or reception, or alternatively, the UE does not expect to transmit the dynamically scheduled UL transmission.

In some examples of this embodiment, when a HD-FDD UE is dynamically scheduled with UL transmission and semi-statically configured with a DL reception occasion which overlap in time domain, the UE prioritizes the dynamically scheduled UL transmission.

In one version of the above embodiment, the HD-FDD UE prioritizes dynamically scheduled UL transmission by ignoring the DL reception occasion if the DL reception occasion starts later than Tproc, 2 after the end of DCI scheduling the UL transmission. Otherwise, the UE prioritizes processing an earlier transmission or reception, or alternatively, the UE does not expect to transmit the dynamically scheduled UL transmission. This is illustrated in FIG. 12.

FIG. 12 is an illustration of an example of a HD-FDD UE being dynamically scheduled with PUSCH overlapping with a DL SPS occasion. Since the DL SPS occasion starts later than Tproc, 2 after the end of the DCI scheduling PUSCH, the UE ignores the DL SPS occasion or cancels the DL SPS reception, and only transmits the PUSCH. FIG. 12 is also an illustration of the method of FIG. 11.

In one embodiment, when the HD-FDD UE is dynamically scheduled with a UL transmission and semi-statically configured with a DL reception occasion which overlap in the time domain, the UE prioritizes the dynamically scheduled UL transmission, and the UE does not perform the DL reception.

Figure 13:
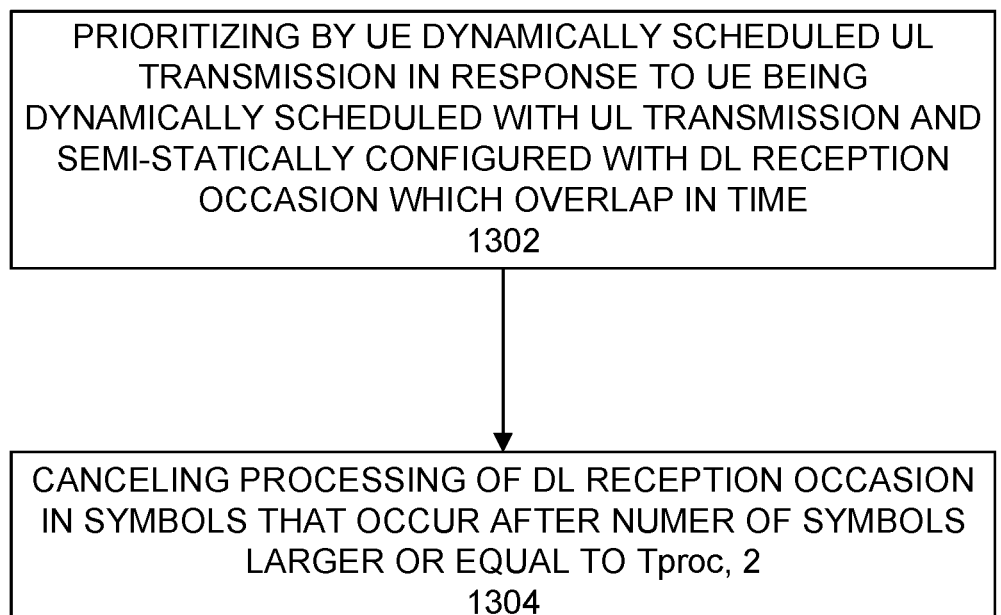
FIG. 13 is a flow chart of an example of a method for applying another prioritization rule by user equipment for handling downlink and uplink collisions according to some embodiments of inventive concepts.

FIG. 13 is a flow chart of an example of a method for applying another prioritization rule by user equipment for handling downlink and uplink collisions according to some embodiments of inventive concepts. In block 1302, the method includes prioritizing by the UE dynamically scheduled UL transmission in response to the UE being dynamically scheduled with UL transmission and semi-statically configured with DL reception occasion which overlap in time.

In block 1304, the method includes canceling processing of the DL reception occasion in symbols that occur after a number of symbols larger or equal to Tproc, 2.

In another version of the above embodiment, the UE prioritizes dynamically scheduled UL transmission by cancelling processing DL reception in symbols which occur after a number of symbols that is larger or equal to Tproc, 2. This is illustrated in FIG. 14.

Figure 14:
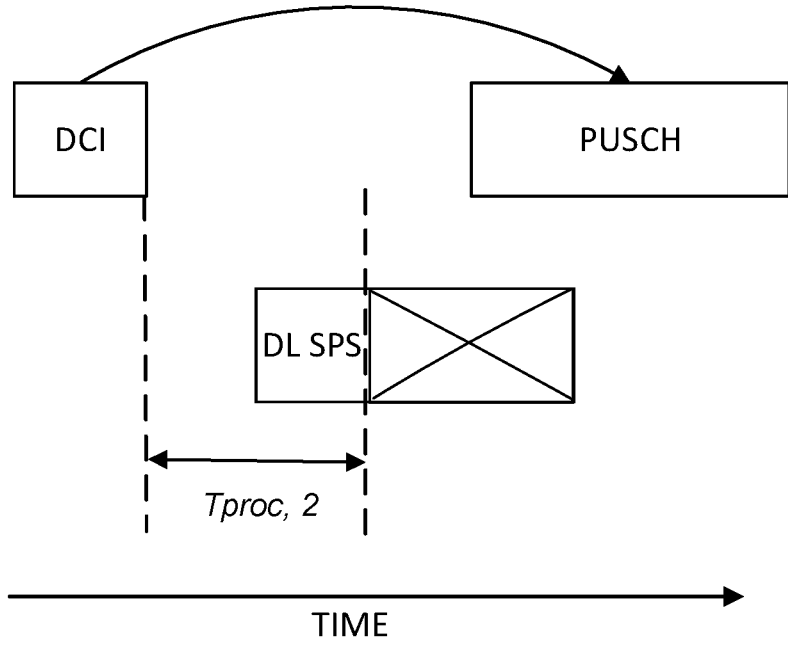
FIG. 14 is an illustration of the method of FIG. 13.

FIG. 14 illustrated an example of a HD-FDD UE being dynamically scheduled with PUSCH overlapping with a DL SPS occasion. The UE cancels processing DL SPS reception in symbols which occur after a number of symbols that is larger or equal to Tproc, 2. FIG. 14 is also an illustration of the method of FIG. 13.

Note that dynamically scheduled UL transmission mentioned in the embodiments in this section may also include PUSCH msg3, scheduled by a Random-access response (RAR) in the random-access procedure. That is, PUSCH msg3, scheduled by RAR is treated as a dynamically scheduled UL transmission in the prioritization procedure in some embodiments.

4. Semi-Statically Configured UL Transmission Vs. Semi-Statically Configured DL Reception FIG. 15 is a flow chart of an example of a method for applying another prioritization rule by user equipment for handling downlink and uplink collisions according to some embodiments of inventive concepts. In block 1502, the method includes prioritizing by the UE UL transmission or DL reception that starts earlier in overlapped occasions in response to the UE being configured to have both CG PUSCH and SPS PDSCH where one or more transmission and reception occasions overlap due to different periodicities in the uplink and downlink.

In block 1504, the method includes canceling UL transmission or DL reception that starts later in an overlapped occasion. In another example, the method includes canceling the overlapped part of the UL transmission or DL reception. In a further example, the method includes canceling the overlapped part and at least one additional orthogonal frequency-division multiplexing (OFDM) symbol following the overlapped part to facilitate DL-to-UL or UL-to-DL switching.

In one embodiment, a HD-FDD UE is not expected to be configured to transmit in UL and receive in DL where the transmission and reception starts at the same symbol.

In another embodiment, if a HD-FDD UE is configured to transmit in UL and receive in DL where the transmission and reception occasions start at the same symbol, the UE prioritizes the transmission or reception which was activated/configured earlier.

In yet another embodiment, if a HD-FDD UE is configured to transmit in UL and receive in DL where the transmission and reception occasions start at the same symbol, the UE prioritizes the transmission or reception which was activated/configured later.

In yet another embodiment, if a HD-FDD UE is configured to have both CG PUSCH and SPS PDSCH, where one or more transmission and reception occasions overlap due to different periodicities in the uplink and downlink, the UE prioritizes the transmission or reception that starts earlier in the overlapped occasions. An example is illustrated in FIG. 16.

Figures 16, 18:
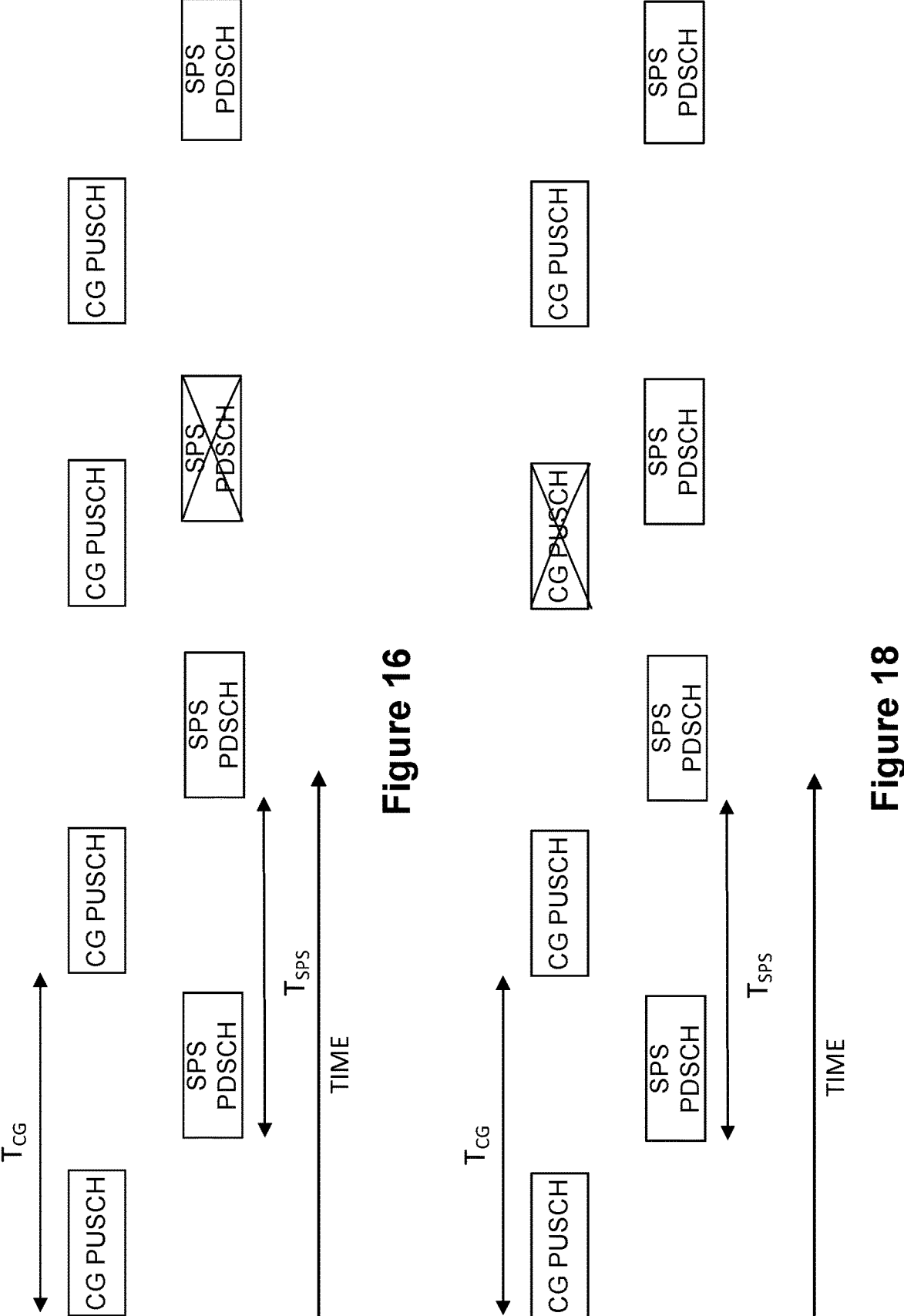
FIG. 16 is an illustration of the method of FIG. 15.
FIG. 18 is an illustration of the method of FIG. 17.

FIG. 16 is an illustration of an example of a HD-FDD UE being configured with overlapped CG PUSCH and SPS PDSCH and prioritizing the CG PUSCH in the overlapped occasions due to the overlapped PUSCH occasion starting earlier than the overlapped PDSCH occasion. FIG. 16 is also an illustration of the exemplary method of FIG. 15.

FIG. 17 is a flow chart of an example of a method for applying another prioritization rule by user equipment for handling downlink and uplink collisions according to some embodiments of inventive concepts. In block 1702, the method includes prioritizing by the UE UL transmission or DL reception that has higher priority in overlapped occasions in response to the UE being configured to have both CG PUSCH and SPS PDSCH where one or more transmission and reception occasions overlap due to different periodicities in the uplink and downlink.

In block 1704, the method includes canceling or ignoring UL transmission or DL reception with lower priority in overlapped occasions. In another embodiment, the method includes canceling an overlapped part of the UL transmission or DL reception. In a further embodiment, the method includes canceling at least one additional OFDM symbol to facilitate DL-to-UL or UL-to-DL switching.

In examples of this embodiment, if a HD-FDD UE is configured to have both CG PUSCH and SPS PDSCH, where one or more transmission and reception occasions overlap due to different periodicities in the uplink and downlink, the UE prioritizes the transmission or reception which is configured with a higher priority between the overlapped occasions. An example is illustrated in FIG. 18. FIG. 18 is an illustration of an example of a HD-FDD UE being configured with overlapped CG PUSCH and SPS PDSCH and prioritizing the SPS PDSCH in the overlapped occasions due to higher priority configured for SPS PDSCH. FIG. 18 is also an illustration of the method of FIG. 17.

Figure 19:
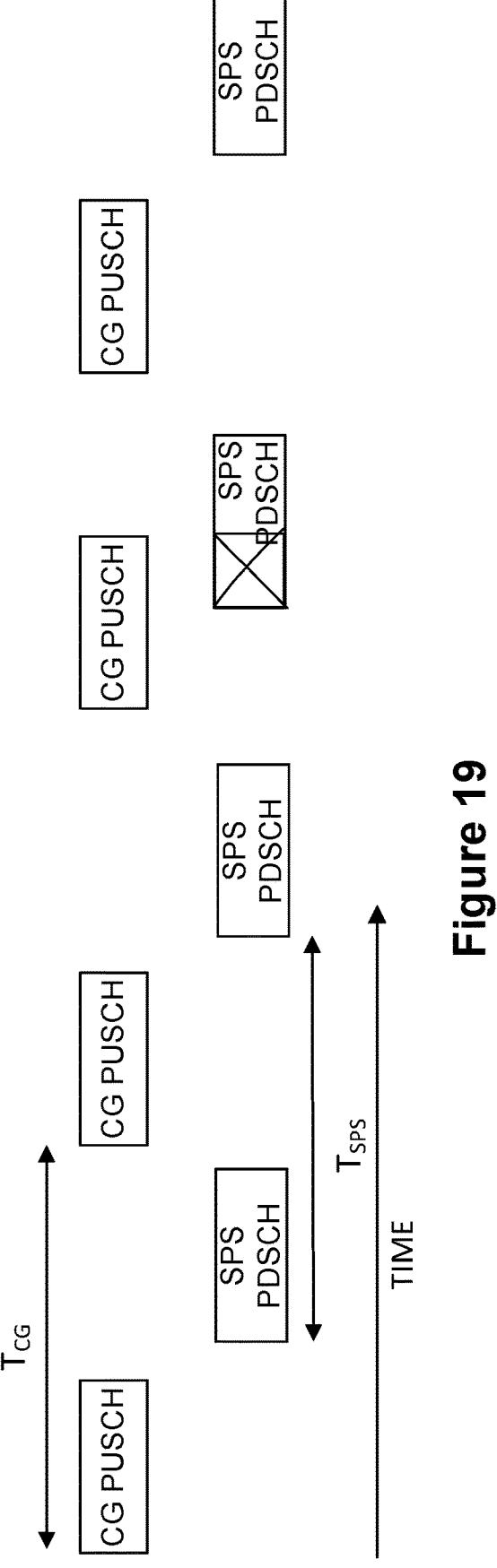
FIG. 19 is another illustration of the method of FIG. 17.

In yet another embodiment, instead of cancelling the entire overlapped transmission or reception occasion, only the overlapped part or the overlapped part plus one additional OFDM symbol immediately following the overlapped part is cancelled. Cancelling one additional OFDM symbol is for facilitating DL-to-UL or UL-to-DL switching. An example is illustrated in FIG. 19. FIG. 19 is an illustration of an example of a HD-FDD UE being configured with overlapped CG PUSCH and SPS PDSCH and prioritizing the CG PUSCH in the overlapped occasions due to the overlapped PUSCH occasion starting earlier than the overlapped PDSCH occasion. Only the overlapped part plus at least one additional OFDM symbol in the overlapped PUSCH occasion is cancelled.

5. Retransmission of the Dropped Transmission

In one embodiment, transmissions/receptions that have been partially or fully canceled or dropped are only dropped in L1 (physical layer), not in medium access control (MAC), meaning that the dropped transmissions can be rescued by HARQ retransmission as discussed with reference to block 108 in FIG. 1.

In the cases where a DL SPS/UL CG transmission is dropped or canceled, DL/UL data can alternatively be sent as a dynamic HARQ retransmission of the DL SPS/UL CG data.

6. Other Prioritization Rules

In one embodiment, a prioritization rule when there is a collision between DL reception and UL transmission can be configured to a UE, e.g., by radio resource control (RRC) parameters.

In another embodiment, when colliding UL transmission and DL reception are associated with priority information which are different, the UE always prioritizes the UL transmission or DL reception which has a higher priority. That is, the UE drops or cancels processing of the lower priority transmission/reception.

In another embodiment, the prioritization could be determined based on the RNTI associated with DCI scheduling UL transmission or DL reception. For example, a RAR, scheduled by DCI with CRC scrambled by RA-RNTI, could have precedence over PUSCH.

In yet another embodiment, the prioritization could be determined based on a combination of the radio network temporary identifier (RNTI) associated with DCI scheduling transmission or reception and New Data Indicator (NDI) value indicated in the DCI. For example, a PUSCH, scheduled by DCI with CRC scrambled by CS-RNTI with NDI=1, could have precedence over PDSCH.

In yet another embodiment, the prioritization could be determined based on whether UL transmission or DL reception is a first transmission/reception or a scheduled retransmission. For example, a HARQ retransmission of PDSCH could have precedence over a first transmission of PUSCH.

In one other embodiment, the prioritization can be determined based on the decodability of the earlier scheduled transmission/receiving. In this embodiment, the UE cancels the earlier scheduled transmission or reception when the expected coded rate for the earlier scheduled transmission/receiving would be smaller than a threshold.

7. HARQ Feedback for Dropped Transmissions

When a transmission is partially dropped, it is still possible that it is can be successfully decoded anyway, in particular if only a small fraction of the transmission is dropped, or if the partially dropped transmission is a HARQ retransmission.

For a partially dropped UL transmission, this can be taken care of by the network node scheduler 2106 or 2206 selectively ordering a retransmission depending on whether the partially dropped transmission was successfully received or not by the network node. For a partially dropped DL reception, however, the network node may need to be aware whether its transmission was successfully received or not by the UE.

In one embodiment, the UE transmits HARQ-ACK feedback in response to any partially dropped PDSCH reception.

In one embodiment, the UE never transmits HARQ-ACK feedback in response to a partially dropped PDSCH reception.

In one embodiment, the UE transmits HARQ-ACK feedback when a sufficiently large enough part of the PDSCH was received. This may, for example, be expressed as a predetermined number of received OFDM symbols, or a predetermined fraction of the total number of OFDM symbols in the scheduled PDSCH transmission.

In one embodiment, the UE transmits HARQ-ACK feedback in response to a partially dropped transmission that is a HARQ retransmission, but not for a first transmission.

In one embodiment, the UE transmits only positive HARQ-ACK feedback in response to a partially dropped PDSCH reception, indicating a successful reception, but does not transmit negative HARQ-ACK feedback.

In one embodiment, the UE transmits HARQ-ACK feedback based on an explicit indication. This explicit indication may be the explicit cancellation indication included in a DCI according to earlier embodiments, or a separate indication sent in the same DCI, or otherwise be indicated to the UE.

When transmitting HARQ-ACK feedback for a partially dropped PDSCH transmission according to the embodiments above, the UE may use the allocated PUSCH or PUCCH resources in the same manner as if the whole PDSCH transmission had been received.

In one embodiment, a network node that has allocated a PUCCH resource to be used by a UE, but the PUCCH resource is not used for this purpose in response to the PDSCH being fully or partially dropped, the network node uses the PUCCH resource for other purposes, such as scheduling a PUSCH transmission from the same UE or a different UE.

Many of the embodiments herein are described in terms of the behavior for a transmitting or receiving part in one particular node, such as a UE. However, when this behavior is known by a corresponding receiving or transmitting node, such as a network node (e.g., an NR gNB), the embodiments have a corresponding counterpart in this other node. For example, when a UE is known to fully or partially drop the reception of a PDSCH, the network node may similarly refrain from transmitting the same (part of the) PDSCH. As another example, when a UE is known to fully or partially drop a PUSCH transmission, the network node may refrain from receiving that (part of the) PUSCH. It has also been described in some of the embodiments above that a dropped UE transmission or reception may trigger the network node scheduling a later UL or DL (re)transmission. Such a scheduling action will result in the UE performing a corresponding other transmission or reception.

Embodiments described herein may be suitably combined where applicable.

Figure 20:
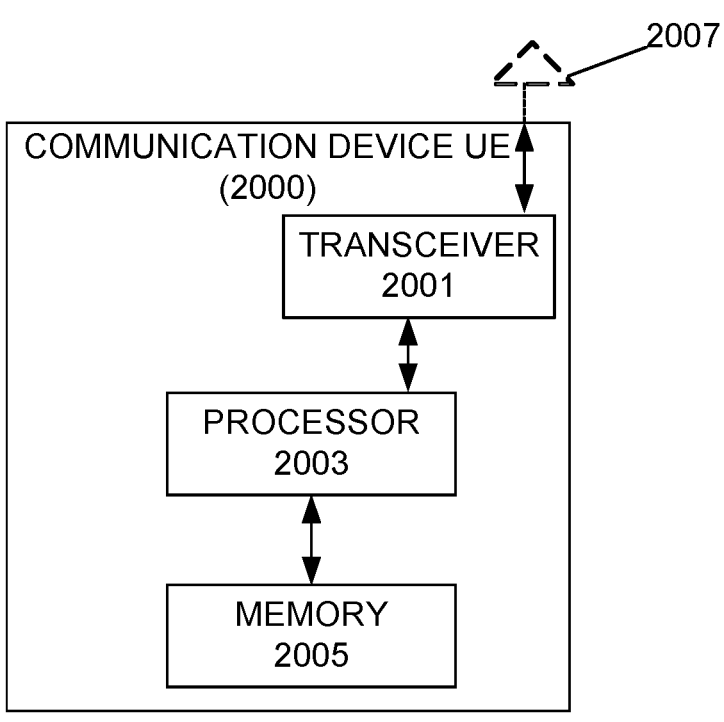
FIG. 20 is a block diagram illustrating a wireless device UE according to some embodiments of inventive concepts.

FIG. 20 is a block diagram illustrating elements of a communication device UE 2000 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 2000 may be provided, for example, as discussed below with respect to wireless device 4110 of FIG. 23, UE 4200 of FIG. 24, virtualization hardware 4430 and virtual machine 4340 of FIG. 25, UEs 4491, 4492 of FIG. 26, and UE 4530 of FIG. 27, all of which should be considered interchangeable in the examples and embodiments described herein and be within the intended scope of this disclosure, unless otherwise noted.) As shown, communication device UE may include an antenna 307 (e.g., corresponding to antenna 4111 of FIG. 23 and/or antenna 43225 of FIG. 25), and transceiver circuitry 2001 (also referred to as a transceiver, e.g., corresponding to interface 4114 of FIG. 23, interfaces 4205, 4209, 4211, transmitter 4233 and receiver 4235 of FIG. 24, transmitter 43210 and receiver 43220 of FIG. 25, and radio interface 4537 of FIG. 27) including a transmitter and a receiver configured to provide uplink and downlink radio communications with a base station(s) (e.g., corresponding to network node 4160 of FIG. 23, also referred to as a RAN node) of a radio access network. Communication device UE may also include processing circuitry 2003 (also referred to as a processor, e.g., corresponding to processing circuitry 4120 of FIG. 23, processor 4201 of FIG. 24, processing circuitry 4360 of FIG. 25, and processing circuitry 4538 of FIG. 27) coupled to the transceiver circuitry, and memory circuitry 305 (also referred to as memory, e.g., corresponding to device readable medium 4130 of FIG. 23 and or memory 4390 of FIG. 25) coupled to the processing circuitry. The memory circuitry 305 may include computer readable program code that when executed by the processing circuitry 2003 causes the processing circuitry to perform operations according to embodiments disclosed herein. According to other embodiments, processing circuitry 2003 may be defined to include memory so that separate memory circuitry is not required. Communication device UE may also include an interface (such as a user interface) coupled with processing circuitry 2003, and/or communication device UE may be incorporated in a vehicle.

As discussed herein, operations of communication device UE may be performed by processing circuitry 2003 and/or transceiver circuitry 2001. For example, processing circuitry 2003 may control transceiver circuitry 2001 to transmit communications through transceiver circuitry 2001 over a radio interface to a radio access network node (also referred to as a base station) and/or to receive communications through transceiver circuitry 2001 from a RAN node over a radio interface. Moreover, modules may be stored in memory circuitry 305, and these modules may provide instructions so that when instructions of a module are executed by processing circuitry 2003, processing circuitry 2003 performs respective operations (e.g., operations discussed below with respect to Example Embodiments relating to wireless communication devices). According to some embodiments, a communication device UE 2000 and/or an element(s)/function(s) thereof may be embodied as a virtual node/nodes and/or a virtual machine/machines.

Figure 21:
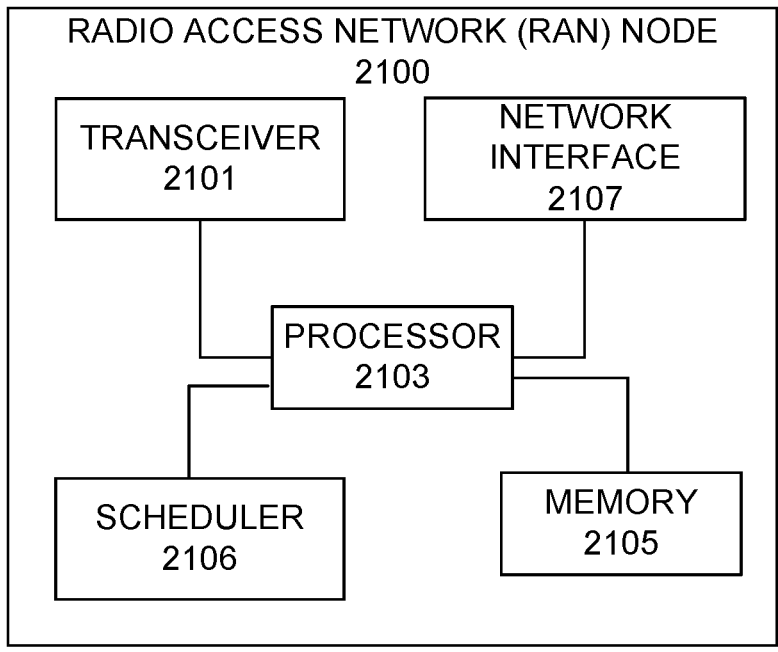
FIG. 21 is a block diagram illustrating a radio access network RAN node (e.g., a base station eNB/gNB) according to some embodiments of inventive concepts.

FIG. 21 is a block diagram illustrating elements of a radio access network RAN node 2100 (also referred to as a network node, base station, eNodeB/eNB, gNodeB/gNB, etc.) of a Radio Access Network (RAN) configured to provide cellular communication according to embodiments of inventive concepts. (RAN node 2100 may be provided, for example, as discussed below with respect to network node 4160 of FIG. 23, virtual hardware 4330 or virtual machine 4340 of FIG. 25, base stations 4412a, 4412b, and 4412c of FIG. 26 and/or base station 4520 of FIG. 27, all of which should be considered interchangeable in the examples and embodiments described herein and be within the intended scope of this disclosure, unless otherwise noted.) As shown, the RAN node may include transceiver circuitry 2101 (also referred to as a transceiver, e.g., corresponding to portions of interface 4190 of FIG. 23 and/or portions of radio interface 4527 of FIG. 27) including a transmitter and a receiver configured to provide uplink and downlink radio communications with mobile terminals. The RAN node may include network interface circuitry 2107 (also referred to as a network interface, e.g., corresponding to portions of interface 4190 of FIG. 23 network interfaces 4370, 4380 of FIG. 25, and/or portions of communication interface 4526 of FIG. 27) configured to provide communications with other nodes (e.g., with other base stations) of the RAN and/or core network CN. The network node may also include processing circuitry 2103 (also referred to as a processor, e.g., corresponding to processing circuitry 4170 of FIG. 23 processing circuitry 4360 of FIG. 25 and/or processing circuitry 4528 of FIG. 27) coupled to the transceiver circuitry, and memory circuitry 2105 (also referred to as memory, e.g., corresponding to device readable medium 4180 of FIG. 23 and/or memory 4390 of FIG. 25) coupled to the processing circuitry. The memory circuitry 2105 may include computer readable program code that when executed by the processing circuitry 2103 causes the processing circuitry to perform operations according to embodiments disclosed herein. According to other embodiments, processing circuitry 2103 may be defined to include memory so that a separate memory circuitry is not required.

As discussed herein, operations of the RAN node may be performed by processing circuitry 2103, network interface 2107, and/or transceiver 2101. For example, processing circuitry 2103 may control transceiver 2101 to transmit downlink communications through transceiver 2101 over a radio interface to one or more mobile terminals UEs and/or to receive uplink communications through transceiver 2101 from one or more mobile terminals UEs over a radio interface. Similarly, processing circuitry 2103 may control network interface 2107 to transmit communications through network interface 2107 to one or more other network nodes and/or to receive communications through network interface from one or more other network nodes. Moreover, modules may be stored in memory 2105, and these modules may provide instructions so that when instructions of a module are executed by processing circuitry 2103, processing circuitry 2103 performs respective operations (e.g., operations discussed below with respect to Example Embodiments relating to RAN nodes). According to some embodiments, RAN node 2100 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 22:
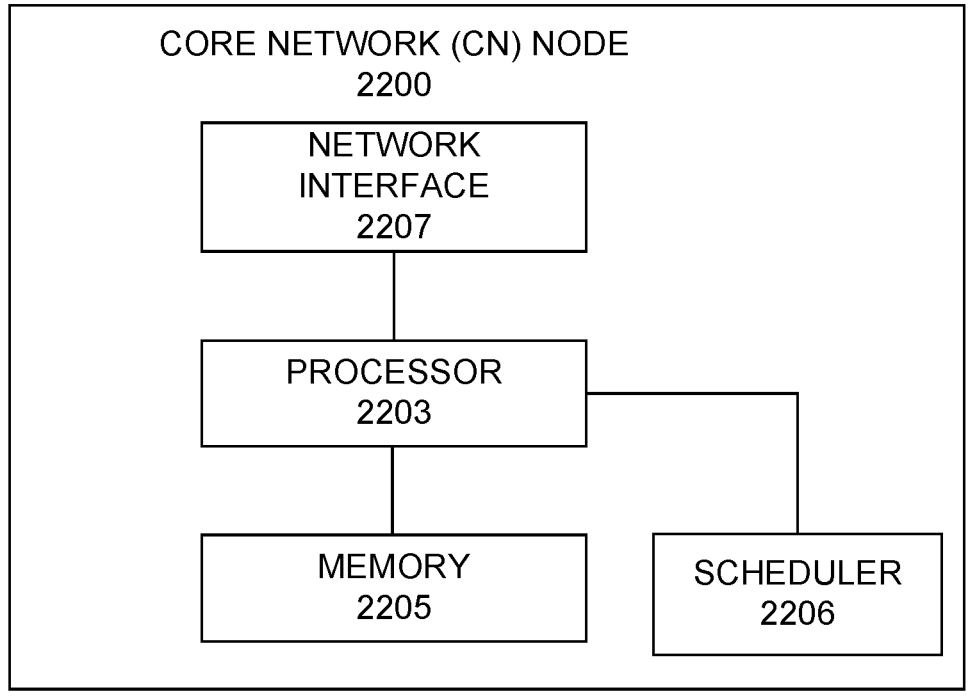
FIG. 22 is a block diagram illustrating a core network CN node (e.g., an AMF node, an SMF node, etc.) according to some embodiments of inventive concepts.

FIG. 22 is a block diagram illustrating elements of a core network CN node (e.g., an SMF node, an AMF node, etc.) of a communication network configured to provide cellular communication according to embodiments of inventive concepts. (CN node 2200 may be provided, for example, as discussed below with respect to network node 4160 of FIG. 23, virtual hardware 4330 or virtual machine 4340 of FIG. 25, all of which should be considered interchangeable in the examples and embodiments described herein and be within the intended scope of this disclosure, unless otherwise noted) As shown, the CN node may include network interface circuitry 2207 (also referred to as a network interface e.g., corresponding to portions of interface 4190 of FIG. 23 and/or network interfaces 4370, 4380 of FIG. 25) configured to provide communications with other nodes of the core network and/or the radio access network RAN. The CN node may also include a processing circuitry 2203 (also referred to as a processor, e.g., corresponding to processing circuitry 4170 of FIG. 23 and/or processing circuitry 4360 of FIG. 25) coupled to the network interface circuitry, and memory circuitry 2205 (also referred to as memory, e.g., corresponding to device readable medium 4180 of FIG. 23 and/or memory 4390 of FIG. 25) coupled to the processing circuitry. The memory circuitry 2205 may include computer readable program code that when executed by the processing circuitry 2203 causes the processing circuitry to perform operations according to embodiments disclosed herein. According to other embodiments, processing circuitry 2203 may be defined to include memory so that a separate memory circuitry is not required.

As discussed herein, operations of the CN node may be performed by processing circuitry 2203 and/or network interface circuitry 2207. For example, processing circuitry 2203 may control network interface circuitry 2207 to transmit communications through network interface circuitry 2207 to one or more other network nodes and/or to receive communications through network interface circuitry from one or more other network nodes. Moreover, modules may be stored in memory 2205, and these modules may provide instructions so that when instructions of a module are executed by processing circuitry 2203, processing circuitry 2203 performs respective operations (e.g., operations discussed below with respect to Example Embodiments relating to core network nodes). According to some embodiments, CN node 500 and/or an element(s)/function(s) thereof may be embodied as a virtual node/nodes and/or a virtual machine/machines.

In the description that follows, while the communication device may be any of the communication device 2000, wireless device 4110, the UE 4200, UEs 4491, 4492, virtual hardware 4330, virtual machine 4340, or UE 4530, the communication device 2000 shall be used to describe the functionality of the operations of the communication device. Operations of the communication device 2000 (implemented using the structure of the block diagram of FIG. 20) were discussed with reference to the flow charts of the Figures herein according to some embodiments of inventive concepts. For example, modules may be stored in memory 305 of FIG. 20, and these modules may provide instructions so that when the instructions of a module are executed by respective communication device processing circuitry 2003, processing circuitry 2003 performs respective operations of the flow chart.

Various operations from the flow charts of the Figures may be optional with respect to some embodiments of communication devices and related methods.

In the description that follows, while the network node may be any of the RAN node 2100, the network node 4160, base stations 4412, the host computer 4430, or the base station 4520, the RAN node 2100 shall be used to describe the functionality of the operations of the network node. Operations of the RAN node 2100 (implemented using the structure of FIG. 21) were discussed with reference to the flow charts of Figures herein according to some embodiments of inventive concepts. For example, modules may be stored in memory 2105 of FIG. 21, and these modules may provide instructions so that when the instructions of a module are executed by respective RAN node processing circuitry 2103, processing circuitry 2103 performs respective operations of the flow chart.

In the description that follows, while the core network node may be any of the core network node 2200 or the network node 4160, the core network node 2200 shall be used to describe the functionality of the operations of the network node. Operations of the Core Network CN node 2200 (implemented using the structure of FIG. 22) were discussed with reference to the flow charts of the Figures herein according to some embodiments of inventive concepts. For example, modules may be stored in memory 2205 of FIG. 22, and these modules may provide instructions so that when the instructions of a module are executed by respective CN node processing circuitry 2203, processing circuitry 2203 performs respective operations of the flow chart.

Example embodiments are discussed below. Reference numbers/letters are provided in parenthesis by way of example/illustration without limiting example embodiments to particular elements indicated by reference numbers/letters.

Embodiment 1.

A method performed by user equipment (4200, 4340, 4491, 4492, 4530), UE, comprising:

receiving (102) a DL reception and transmitting (102) an UL transmission, wherein there is a collision between the DL reception and the UL transmission;

prioritizing (104) for processing the DL reception or the UL transmission by applying a particular prioritization rule of a plurality of prioritization rules depending upon a type of the DL reception and/or the UL transmission; and processing (106) the DL reception or the UL transmission in response to applying the particular prioritization rule.

Embodiment 2.

The method of Embodiment 1, wherein prioritizing (104) for processing the DL reception or UL transmission comprises prioritizing (202) an earlier of the DL reception or the UL transmission; and wherein the method further comprises:

processing (204) the earlier of the DL reception or the UL transmission until the processing is complete; and processing (206) another DL reception or UL transmission after completing the processing (204) of the earlier of the DL reception or the UL transmission plus a predetermined switching time.

Embodiment 3.

The method of embodiment 1, wherein prioritizing (104) for processing the DL reception or UL transmission comprises prioritizing (302) the DL reception or the UL transmission which is scheduled later in time in response to the UE being dynamically scheduled with the DL reception and the UL transmission which overlap in the time domain, the method further comprising:

canceling (304) processing of the DL reception or the UL transmission scheduled earlier in time.

Embodiment 4.

The method of embodiment 3, wherein a DCI of the DL reception or the UL transmission which is scheduled later in time comprises an explicit cancellation indication (602) to indicate to the UE to cancel an earlier scheduled one of the UL transmission or the DL reception.

Embodiment 5.

The method of embodiment 1, wherein prioritizing (104) for processing the DL reception or UL transmission comprises prioritizing (702) a dynamically scheduled DL reception by the UE in response to the UE being dynamically scheduled with the DL reception and semi-statically configured with a UL transmission occasion which overlap in time, the method further comprising:

canceling (704) the UL transmission if the UL transmission occasion starts later than Tproc, 2 after an end of the DCI scheduling the DL reception.

Embodiment 6.

The method of embodiment 5, wherein the UE prioritizes processing an earlier of the UL transmission or the DL reception in response to the UL transmission occasion not starting later than Tproc, 2 after the end of the DCI scheduling the DL reception, or alternatively, the UE does not expect to receive the dynamically scheduled DL reception.

Embodiment 7.

The method of embodiment 1, wherein prioritizing (104) for processing the DL reception or UL transmission comprises prioritizing (902) a dynamically scheduled DL reception in response to the UE being dynamically scheduled with the DL reception and semi-statically configured with a UL transmission occasion which overlap in time, the method further comprising:

canceling (904) processing of the UL transmission, if any, in symbols occurring after a number of symbols that is larger than or equal to Tproc, 2 after an end of DCI scheduling the DL reception.

Embodiment 8.

The method of embodiment 1, wherein prioritizing (104) for processing the DL reception or UL transmission comprises prioritizing (1202) by the UE a dynamically scheduled UL transmission in response to the UE being dynamically scheduled with the UL transmission and semi-statically configured with the DL reception occasion which overlap in time, the method further comprising:

ignoring or canceling (1204) processing of the DL reception occasion if the DL reception starts later than Tproc, 2 after the end of the DCI, otherwise, the UE prioritizes processing an earlier transmission or reception, or alternatively, the UE does not expect to transmit the dynamically scheduled UL transmission.

Embodiment 9.

The method of embodiment 1, wherein prioritizing (104) for processing the DL reception or UL transmission comprises prioritizing (1302) by the UE dynamically scheduled UL transmission in response to the UE being dynamically scheduled with the UL transmission and semi-statically configured with a DL reception occasion which overlap in time, the method further comprising:

canceling (1304) or ignoring processing of the DL reception occasion in symbols that occur after a number of symbols larger than or equal to Tproc, 2.

Embodiment 10.

The method of embodiment 1, wherein prioritizing (104) for processing the DL reception or UL transmission comprises prioritizing (1502) by the UE the UL transmission or the DL reception that starts earlier in overlapped occasions in response to the UE being configured to have both CG PUSCH and SPS PDSCH where one or more transmission and reception occasions overlap due to different periodicities in the uplink and the downlink, the method further comprising:

canceling (1504) or ignoring the UL transmission or DL reception that starts later in the overlapped occasion.

Embodiment 11.

The method of embodiment 10, wherein canceling (1504) or ignoring the UL transmission or the DL reception comprises canceling an overlapped part of the UL transmission or DL reception.

Embodiment 12.

The method of embodiment 10, canceling (1504) or ignoring the UL transmission or the DL reception comprises canceling at least one additional OFDM symbol to facilitate a downlink-to-uplink or an uplink-to-downlink switching.

Embodiment 13.

The method of embodiment 1, wherein prioritizing (104) for processing the DL reception or UL transmission comprises prioritizing (1702) by the UE the UL transmission or the DL reception that has a higher priority in overlapped occasions in response to the UE being configured to have both CG PUSCH and SPS PDSCH where one or more transmission and reception occasions overlap due to different periodicities in the uplink and the downlink, the method further comprising:

canceling (1704) or ignoring the UL transmission or the DL reception with a lower priority in an overlapped occasion.

Embodiment 14.

The method of embodiment 13, wherein the canceling (1704) or ignoring comprises canceling an overlapped part of the UL transmission or the DL reception.

Embodiment 15.

The method of embodiment 13, wherein the canceling (1704) or ignoring comprises canceling at least one additional OFDM symbol to facilitate downlink-to-uplink or uplink-to-downlink switching.

Embodiment 16.

The method of any of embodiments 1-15, further comprising receiving (106), by the UE, any DL reception from a network node, or transmitting (106), by the UE, any UL transmission to a network node, that has been partially or completely canceled, ignored, or dropped.

Embodiment 17.

The method of any of embodiments 1-15, further comprising receiving (106) any DL data, or transmitting (106) any UL data as a dynamic HARQ retransmission.

Embodiment 18.

The method of embodiments 1-15, further comprising transmitting (108), by the UE, a HARQ-ACK feedback message in response to any DL data or any UL data being partially or completely canceled, ignored, or dropped by the UE.

Embodiment 19.

A communication device (2000, 4200, 4330, 4340, 4491, 4492, 4530) comprising:

processing circuitry (2003, 4120, 4201, 4360 4538); and
  memory (2005, 4130, 4215) coupled with the processing circuitry, wherein the memory includes instructions that when executed by the processing circuitry causes the communication device to perform operations according to any of Embodiments 1-18.

Embodiment 20.

A communication device (2000, 4200, 4330, 4340, 4491, 4492, 4530) adapted to perform according to any of Embodiments 1-18.

Embodiment 21.

A computer program comprising program code to be executed by processing circuitry (2003, 4120, 4201, 4360, 4538) of a communication device (2000, 4200, 4330, 4340, 4491, 4492, 4530), whereby execution of the program code causes the communication device (2000, 4200, 4330, 4340, 4491, 4492, 4530) to perform operations according to any of embodiments 1-18.

Embodiment 22.

A computer program product comprising a non-transitory storage medium including program code to be executed by processing circuitry (2003, 4120, 4201, 4360, 4538) of a communication device (2000, 4200, 4330, 4340, 4491, 4492, 4530), whereby execution of the program code causes the communication device (2000, 4200, 4330, 4340, 4491, 4492, 4530) to perform operations according to any of embodiments 1-18.

Explanations are provided below for various abbreviations/acronyms used in the present disclosure.

| Abbreviation | Explanation |
| --- | --- |
| CG | Configured Grant |
| CSI-RS | Channel State Information Reference Signal |
| DCI | Downlink Control Information |
| DL | Downlink |
| DC | Dual Connectivity |
| DCI | Downlink Control Information |
| FDD | Frequency Division Duplex |
| HD-FDD | Half Duplex FDD |
| LTE | Long Term Evolution |
| NDI | New Data Indicator |
| NR | New Radio |
| NR-RedCap | Reduced Capability NR Devices |
| PDCCH | Physical Downlink Control Channel |
| PDSCH | Physical Downlink Shared Channel |
| PUCCH | Physical Uplink Control Channel |
| PUSCH | Physical Uplink Shared Channel |
| SCS | Subcarrier Spacing |
| SR | Scheduling Request |
| SPS | Semi-Persistent Scheduling |
| SRS | Sounding Reference Signal |
| SSB | Synchronization Signal Block |
| UE | User equipment |
| UL | Uplink |

References are identified below.

[1] RP-202933, New WID on support of reduced capability NR devices, 3GPP TSG RAN #90e, December 2020.
[2] TR 38.875, "Study on support of reduced capability NR devices (Release 17)," December 2020.
[3] TS 36.211, v. 16.4.0, "Evolved Universal Terrestrial Radio Access (E-UTRA); Physical channels and modulation".
[4] TS 38.211, v. 16.4.0, "NR; Physical channels and modulation".
[5] TS 38.214, v. 16.4.0, "NR, Physical layer procedures for data".

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 23:
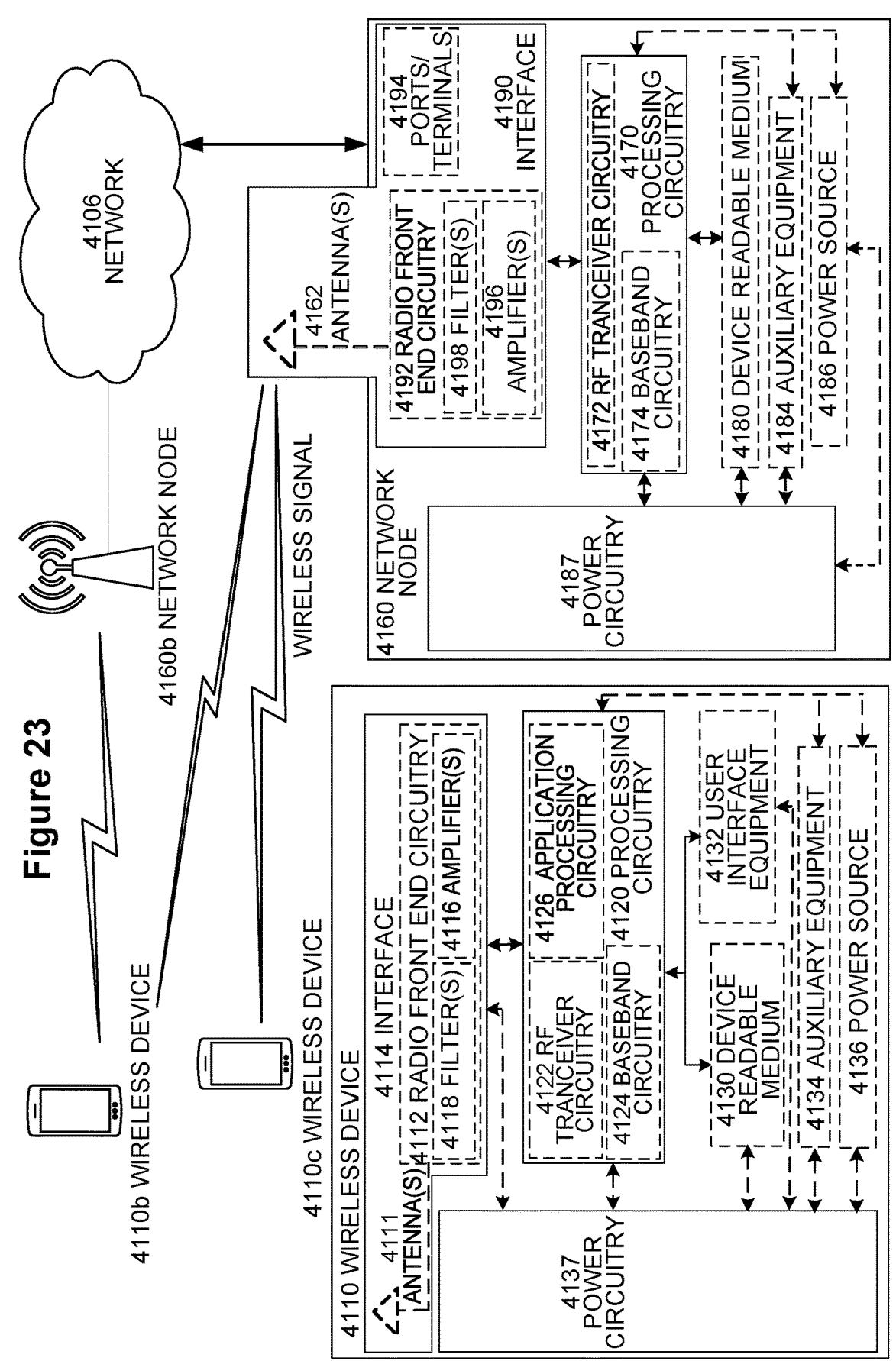
FIG. 23 is a block diagram of a wireless network in accordance with some embodiments.

FIG. 23 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 23. For simplicity, the wireless network of FIG. 23 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 23, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 23 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information, or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part, or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data, or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signaling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all, or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 23 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some, or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part, or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices, and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 24:
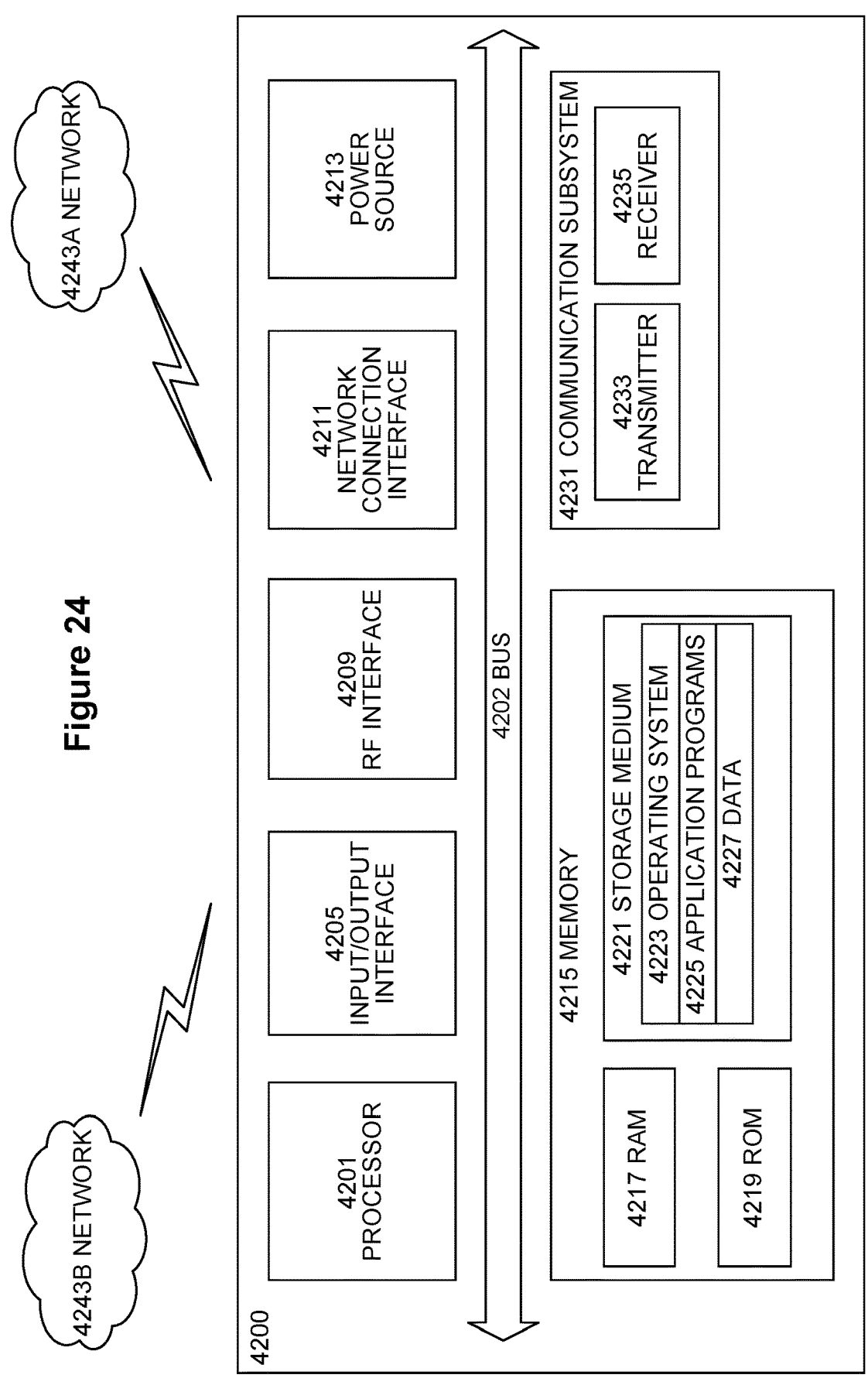
FIG. 24 is a block diagram of a user equipment in accordance with some embodiments

FIG. 24 illustrates a user Equipment in accordance with some embodiments.

FIG. 24 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 4200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 24, is one example of a WD configured for communication in accordance with one or more communication standards promulgated by the 3rd Generation Partnership Project (3GPP), such as 3GPP's GSM, UNITS, LTE, and/or 5G standards. As mentioned previously, the term WD and UE may be used interchangeable. Accordingly, although FIG. 24 is a UE, the components discussed herein are equally applicable to a WD, and vice-versa.

In FIG. 24, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 24, or only a subset of the components. The level of integration between the components may vary from one UE to another UE. Further, certain UEs may contain multiple instances of a component, such as multiple processors, memories, transceivers, transmitters, receivers, etc.

In FIG. 24, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 24, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software, or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 24, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software, or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software, or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 25:
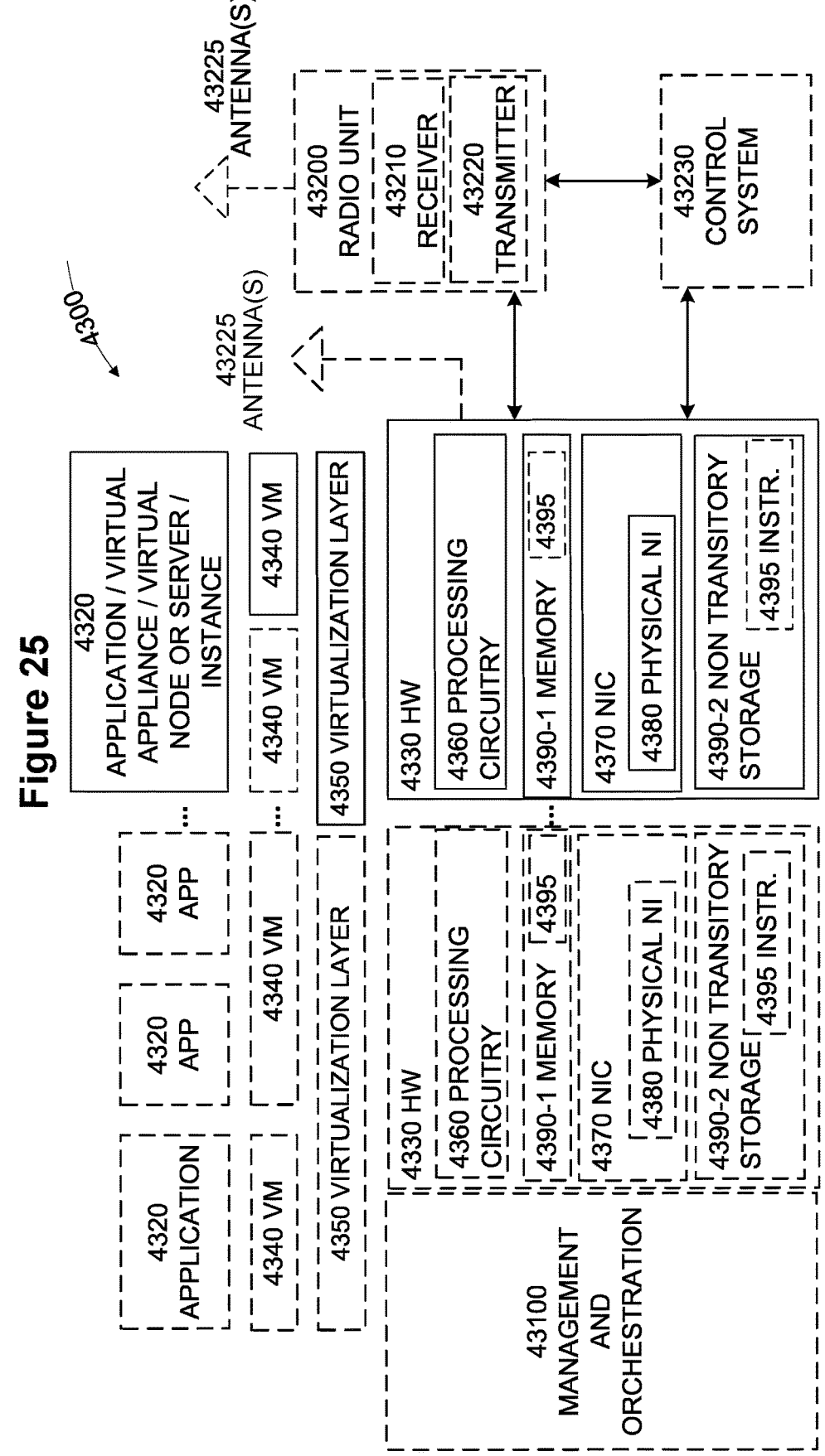
FIG. 25 is a block diagram of a virtualization environment in accordance with some embodiments.

FIG. 25 illustrates a virtualization environment in accordance with some embodiments.

FIG. 25 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 25, hardware 4330 may be a standalone network node with generic or specific components. Hardware 4330 may comprise antenna 43225 and may implement some functions via virtualization. Alternatively, hardware 4330 may be part of a larger cluster of hardware (e.g., such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network element (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 25.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signaling can be effected with the use of control system 43230 which may alternatively be used for communication between the hardware nodes 4330 and radio units 43200.

Figure 26:
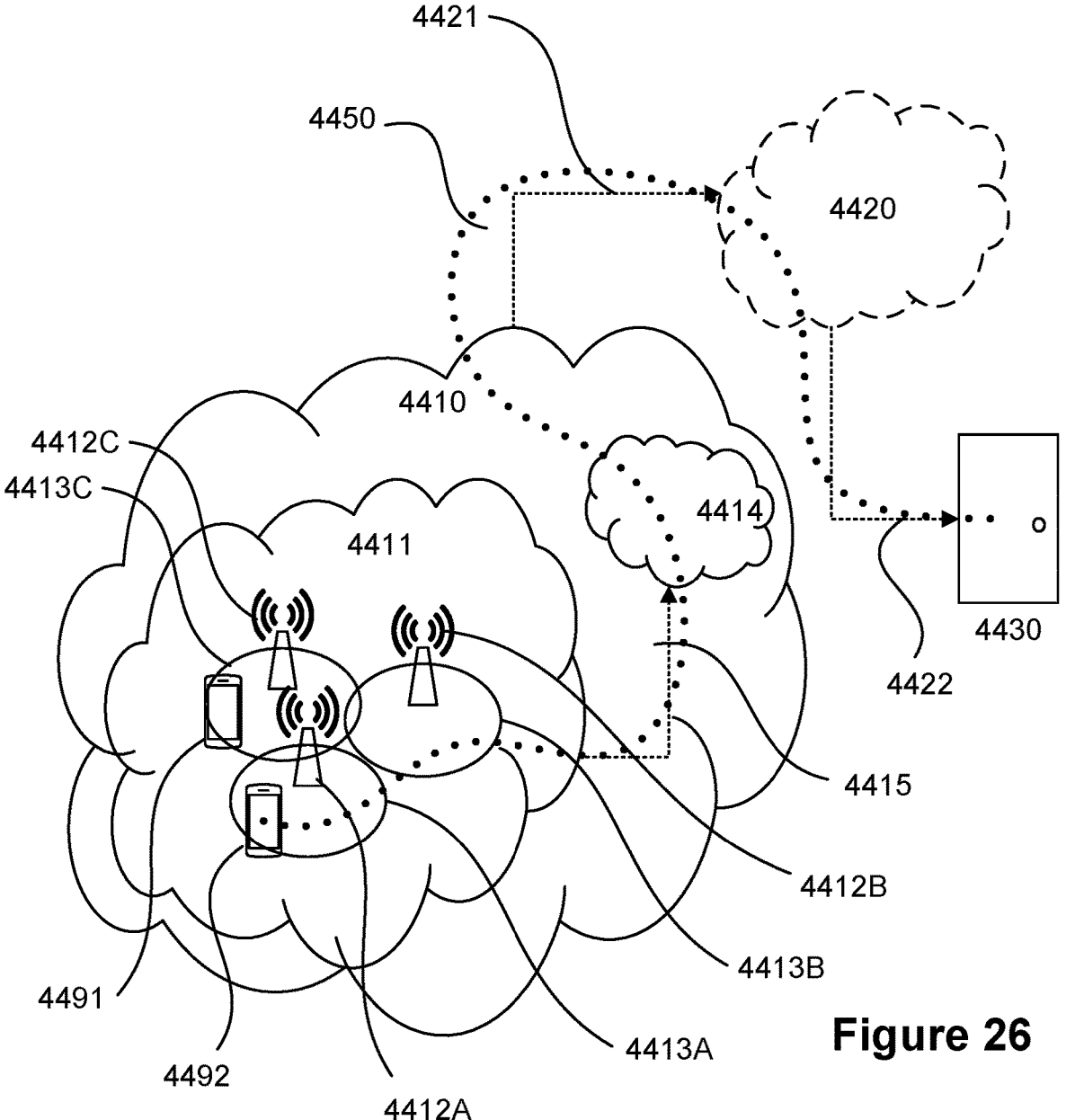
FIG. 26 is a block diagram of a telecommunication network connected via an intermediate network to a host computer in accordance with some embodiments.

FIG. 26 illustrates a telecommunication network connected via an intermediate network to a host computer in accordance with some embodiments.

With reference to FIG. 26, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 26 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 27:
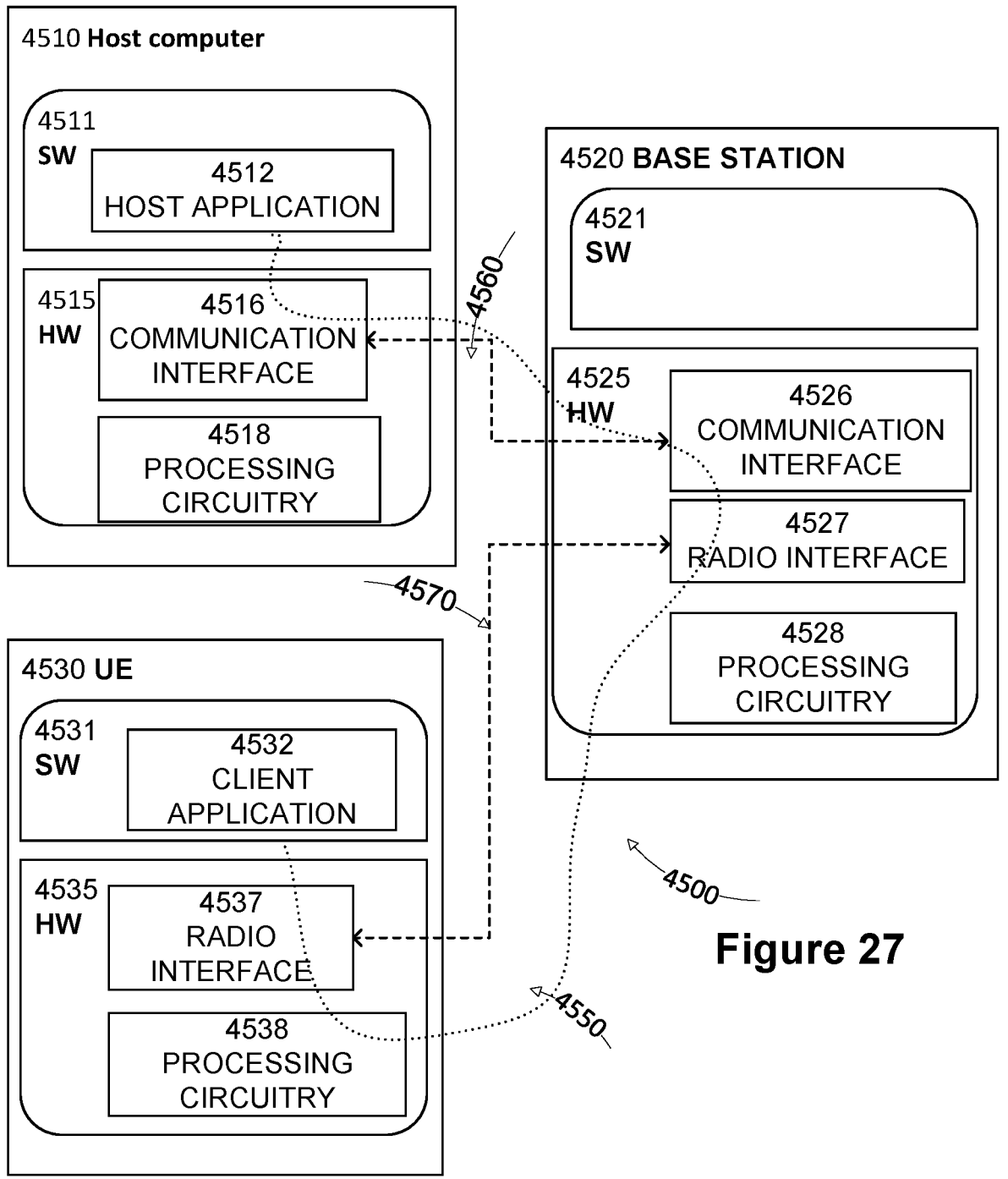
FIG. 27 is a block diagram of a host computer communicating via a base station with a user equipment over a partially wireless connection in accordance with some embodiments.

FIG. 27 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 27. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 27) served by base station 4520. Communication interface 4526 may be configured to facilitate connection 4560 to host computer 4510. Connection 4560 may be direct or it may pass through a core network (not shown in FIG. 27) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. It's hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 27 may be similar or identical to host computer 4430, one of base stations 4412a, 4412b, 4412c and one of UEs 4491, 4492 of FIG. 26, respectively. This is to say, the inner workings of these entities may be as shown in FIG. 27 and independently, the surrounding network topology may be that of FIG. 26.

In FIG. 27, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency, and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figures 28, 29:
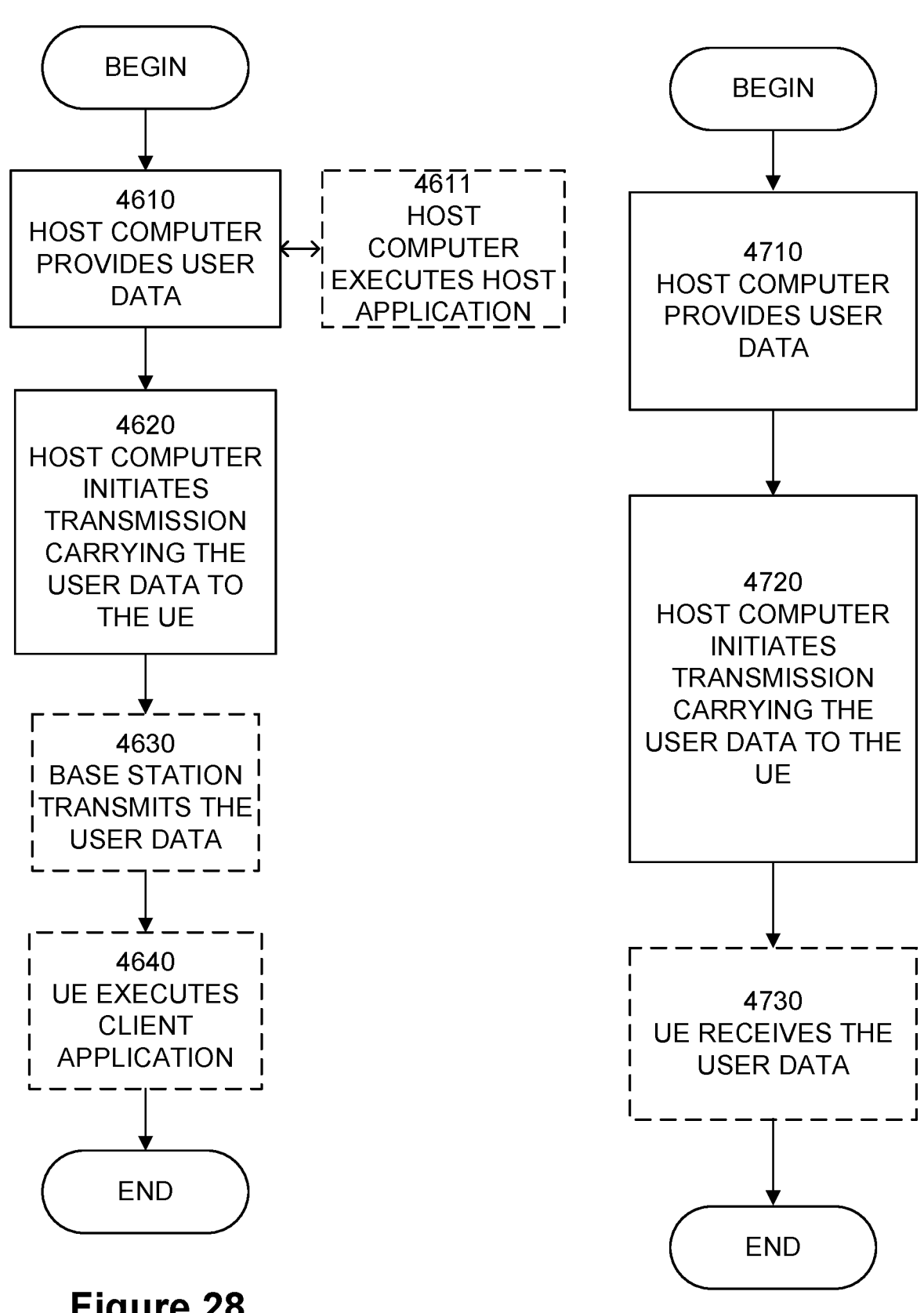
FIG. 28 is a block diagram of methods implemented in a communication system including a host computer, a base station, and a user equipment in accordance with some embodiments.
FIG. 29 is a block diagram of methods implemented in a communication system including a host computer, a base station, and a user equipment in accordance with some embodiments.

FIG. 28 illustrates methods implemented in a communication system including a host computer, a base station, and a user equipment in accordance with some embodiments.

FIG. 28 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 28 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 29 illustrates methods implemented in a communication system including a host computer, a base station, and a user equipment in accordance with some embodiments.

FIG. 29 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 29 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figures 30, 31:
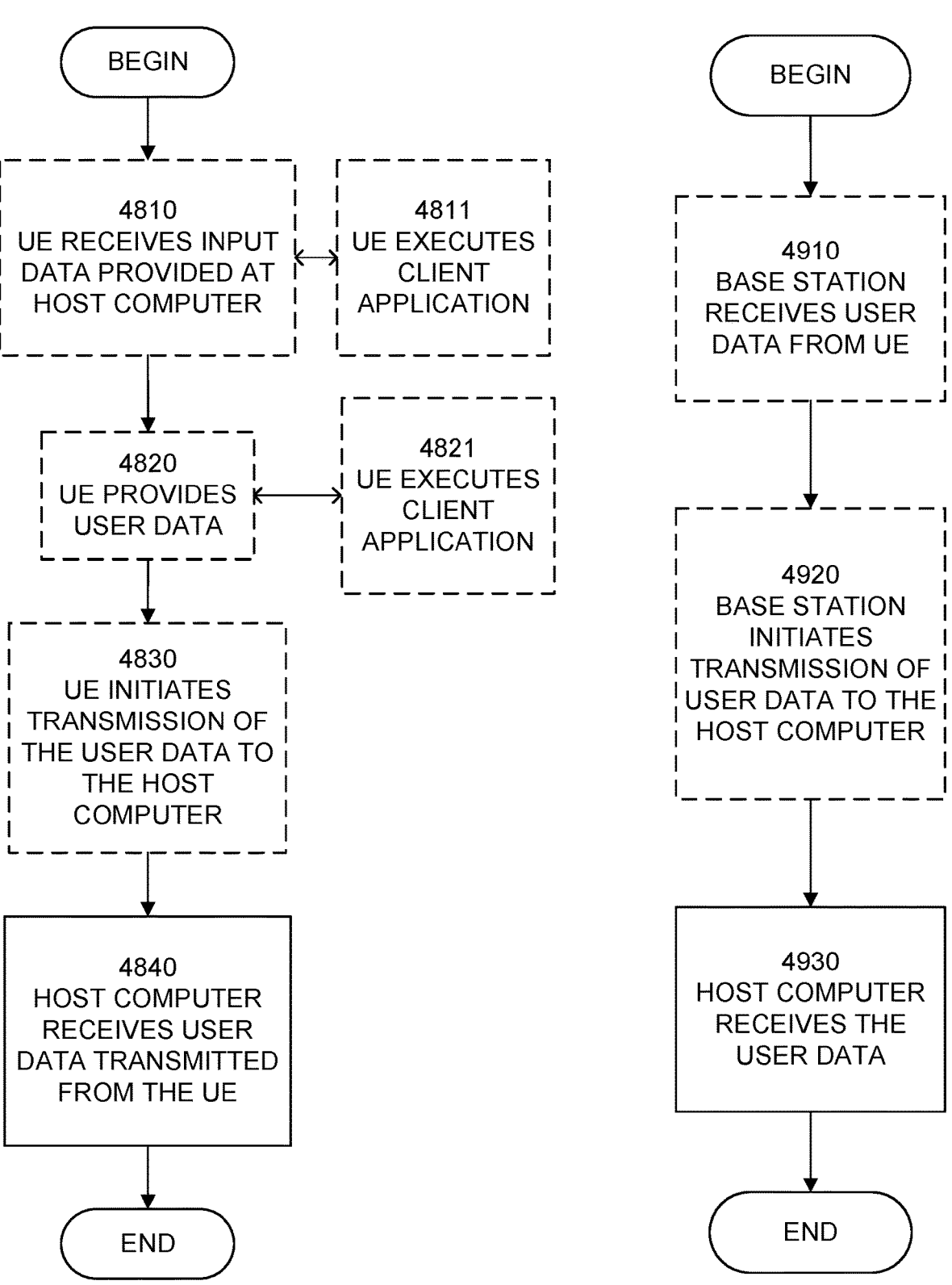
FIG. 30 is a block diagram of methods implemented in a communication system including a host computer, a base station, and a user equipment in accordance with some embodiments.
FIG. 31 is a block diagram of methods implemented in a communication system including a host computer, a base station, and a user equipment in accordance with some embodiments.

FIG. 30 illustrates methods implemented in a communication system including a host computer, a base station, and a user equipment in accordance with some embodiments FIG. 30 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 30 will be included in this section. In step 4810 (which may be optional), the UE receives input data provided by the host computer. Additionally, or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 31 illustrates methods implemented in a communication system including a host computer, a base station, and a user equipment in accordance with some embodiments FIG. 31 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 31 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel

43

SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method performed by user equipment (UE) comprising:

receiving a downlink (DL) reception and transmitting an uplink (UL) transmission, wherein there is a collision between the DL reception and the UL transmission;

prioritizing for processing the DL reception or the UL transmission by applying a particular prioritization rule of a plurality of prioritization rules depending upon a type of the DL reception and/or the UL transmission;

processing the DL reception or the UL transmission in response to applying the particular prioritization rule, wherein prioritizing for processing the DL reception or UL transmission comprises prioritizing a dynamically scheduled DL reception by the UE in response to the UE being dynamically scheduled with the DL reception and semi-statically configured with a UL transmission occasion which overlap in time; and canceling the UL transmission if the UL transmission occasion starts later than Tproc, 2 after an end of a downlink control information (DCI) scheduling the DL reception.

2. The method of claim 1, wherein prioritizing for processing the DL reception or UL transmission comprises prioritizing an earlier of the DL reception or the UL transmission; and wherein the method further comprises:

processing the earlier of the DL reception or the UL transmission until the processing is complete; and processing another DL reception or UL transmission after completing the processing of the earlier of the DL reception or the UL transmission plus a predetermined switching time.

3. The method of claim 1, wherein prioritizing for processing the DL reception or UL transmission comprises prioritizing the DL reception or the UL transmission which is scheduled later in time in response to the UE being dynamically scheduled with the DL reception and the UL transmission which overlap in time domain, the method further comprising:

canceling processing of the DL reception or the UL transmission scheduled earlier in time.

4. The method of claim 3, wherein the DCI of the DL reception or the UL transmission which is scheduled later in time comprises an explicit cancellation indication to indicate to the UE to cancel an earlier scheduled one of the UL transmission or the DL reception.

5. The method of claim 1, wherein the UE prioritizes processing an earlier of the UL transmission or the DL reception in response to the UL transmission occasion not starting later than Tproc, 2 after the end of the DCI scheduling the DL reception or the UE does not expect to receive the dynamically scheduled DL reception.

6. The method of claim 1, wherein prioritizing for processing the DL reception or UL transmission comprises prioritizing a dynamically scheduled DL reception in response to the UE being dynamically scheduled with the DL reception and semi-statically configured with a UL transmission occasion which overlap in time, the method further comprising:

canceling processing of the UL transmission, if any, in symbols occurring after a number of symbols that is larger than or equal to Tproc, 2 after an end of DCI scheduling the DL reception.

7. The method of claim 1, wherein prioritizing for processing the DL reception or UL transmission comprises prioritizing by the UE a dynamically scheduled UL transmission in response to the UE being dynamically scheduled with the UL transmission and semi-statically configured with the DL reception occasion which overlap in time, the method further comprising:

ignoring or canceling processing of the DL reception occasion if the DL reception starts later than Tproc, 2 after the end of the DCI, otherwise, the UE prioritizes processing an earlier transmission or reception, or alternatively, the UE does not expect to transmit the dynamically scheduled UL transmission.

8. The method of claim 1, wherein prioritizing for processing the DL reception or UL transmission comprises prioritizing by the UE dynamically scheduled UL transmission in response to the UE being dynamically scheduled with the UL transmission and semi-statically configured with a DL reception occasion which overlap in time, the method further comprising:

canceling or ignoring processing of the DL reception occasion in symbols that occur after a number of symbols larger than or equal to Tproc, 2.

9. The method of claim 1, wherein prioritizing for processing the DL reception or UL transmission comprises prioritizing by the UE the UL transmission or the DL reception that starts earlier in overlapped occasions in response to the UE being configured to have both CG PUSCH and SPS PDSCH where one or more transmission and reception occasions overlap due to different periodicities in the uplink and the downlink, the method further comprising:

canceling or ignoring the UL transmission or DL reception that starts later in the overlapped occasion.

10. The method of claim 9, wherein canceling or ignoring the UL transmission or the DL reception comprises canceling an overlapped part of the UL transmission or DL reception.

11. The method of claim 9, canceling or ignoring the UL transmission or the DL reception comprises canceling at least one additional OFDM symbol to facilitate a downlink-to-uplink or an uplink-to-downlink switching.

12. The method of claim 1, wherein prioritizing for processing the DL reception or UL transmission comprises prioritizing by the UE the UL transmission or the DL reception that has a higher priority in overlapped occasions in response to the UE being configured to have both CG PUSCH and SPS PDSCH where one or more transmission and reception occasions overlap due to different periodicities in the uplink and the downlink, the method further comprising:

canceling or ignoring the UL transmission or the DL reception with a lower priority in an overlapped occasion.

13. The method of claim 12, wherein the canceling or ignoring comprises canceling an overlapped part of the UL transmission or the DL reception.

14. The method of claim 12, wherein the canceling or ignoring comprises canceling at least one additional OFDM symbol to facilitate downlink-to-uplink or uplink-to-downlink switching.

15. The method of claim 1, further comprising receiving, by the UE, any DL reception from a network node, or transmitting, by the UE, any UL transmission to a network node, that has been partially or completely canceled, ignored, or dropped.

16. The method of claim 1, further comprising receiving any DL data, or transmitting any UL data as a dynamic HARQ retransmission.

17. The method of claim 1, further comprising transmitting, by the UE, a HARQ-ACK feedback message in response to any DL data or any UL data being partially or completely canceled, ignored, or dropped by the UE.

18. A communication device comprising:

processing circuitry; and memory coupled with the processing circuitry, wherein the memory includes instructions that when executed by the processing circuitry causes the communication device to perform operations according to claim 1.

19. A communication device adapted to perform according to:

receive a downlink (DL) reception and transmitting an uplink (UL) transmission, wherein there is a collision between the DL reception and the UL transmission;

prioritize for processing the DL reception or the UL transmission by applying a particular prioritization rule of a plurality of prioritization rules depending upon a type of the DL reception and/or the UL transmission;

process the DL reception or the UL transmission in response to applying the particular prioritization rule, wherein prioritizing for processing the DL reception or UL transmission comprises prioritizing a dynamically scheduled DL reception by a user equipment (UE) in response to the UE being dynamically scheduled with the DL reception and semi-statically configured with a UL transmission occasion which overlap in time; and cancel the UL transmission if the UL transmission occasion starts later than Tproc, 2 after an end of a downlink control information (DCI) scheduling the DL reception.

20. A computer program product comprising a non-transitory storage medium including program code to be executed by processing circuitry of a communication device, whereby execution of the program code causes the communication device to perform operations according to:

receive a downlink (DL) reception and transmitting an uplink (UL) transmission, wherein there is a collision between the DL reception and the UL transmission;

prioritize for processing the DL reception or the UL transmission by applying a particular prioritization rule of a plurality of prioritization rules depending upon a type of the DL reception and/or the UL transmission;

process the DL reception or the UL transmission in response to applying the particular prioritization rule, wherein prioritizing for processing the DL reception or UL transmission comprises prioritizing a dynamically scheduled DL reception by a user equipment (UE) in response to the UE being dynamically scheduled with the DL reception and semi-statically configured with a UL transmission occasion which overlap in time; and cancel the UL transmission if the UL transmission occasion starts later than Tproc, 2 after an end of a downlink control information (DCI) scheduling the DL reception.

* * * * *